United States Patent
Kato

(10) Patent No.: US 9,073,148 B2
(45) Date of Patent: Jul. 7, 2015

(54) FRICTION STIR SPOT WELDING DEVICE AND MEMBER SUPPORT THEREFOR

(75) Inventor: Yoshinori Kato, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 58 days.

(21) Appl. No.: 13/809,216

(22) PCT Filed: Dec. 16, 2010

(86) PCT No.: PCT/JP2010/072646
§ 371 (c)(1),
(2), (4) Date: Jan. 9, 2013

(87) PCT Pub. No.: WO2012/081100
PCT Pub. Date: Jun. 21, 2012

(65) Prior Publication Data
US 2013/0112736 A1 May 9, 2013

(51) Int. Cl.
*B23K 20/12* (2006.01)
*B23K 37/04* (2006.01)

(52) U.S. Cl.
CPC ........... *B23K 20/1245* (2013.01); *B23K 20/125* (2013.01); *B23K 20/126* (2013.01); *B23K 20/1265* (2013.01); *B23K 37/0408* (2013.01); *B23K 2201/18* (2013.01)

(58) Field of Classification Search
CPC ............ B23K 37/04; B23K 37/0408–37/0461; B23K 3/087
USPC .................... 228/2.1, 47.1, 49.1, 50, 112.1
See application file for complete search history.

(56) References Cited

U.S. PATENT DOCUMENTS

| | | | | |
|---|---|---|---|---|
| 5,662,264 | A * | 9/1997 | Gustafsson et al. | 228/170 |
| 7,448,528 | B2 * | 11/2008 | Forrest et al. | 228/112.1 |
| 7,832,613 | B2 * | 11/2010 | Hanlon et al. | 228/2.1 |

(Continued)

FOREIGN PATENT DOCUMENTS

| | | |
|---|---|---|
| JP | 09-057455 | 3/1997 |
| JP | 2000-202646 | 7/2000 |

(Continued)

OTHER PUBLICATIONS

International Search Report issued Jan. 18, 2011 in International (PCT) Application No. PCT/JP2010/072646 with English translation.

(Continued)

*Primary Examiner* — Devang R Patel
(74) *Attorney, Agent, or Firm* — Wenderoth, Lind & Ponack, L.P.P.

(57) ABSTRACT

A member support of a friction stir spot welding device has a backing piece having a bearing surface that contacts work-pieces, and a supporting body that supports the backing piece such that the backing piece tilts with the tilting of the work-pieces, which is in contact with the bearing surface. In the backing piece, the amount of change in the position of the bearing surface on the extension line of the central axis of rotation between a state in which the bearing surface is in a reference state perpendicular to the central axis of rotation of a rotary tool and a state in which the bearing surface tilts in response to the tilting of the work-pieces, is less than or equal to a predetermined embedding amount with which the shoulder part of the rotary tool is embedded in the work-pieces.

19 Claims, 14 Drawing Sheets

(56) References Cited

U.S. PATENT DOCUMENTS

| | | | |
|---|---|---|---|
| 8,033,443 B1 * | 10/2011 | Sigler et al. | 228/2.1 |
| 2007/0039154 A1 * | 2/2007 | Gendou et al. | 29/407.1 |
| 2009/0114624 A1 * | 5/2009 | Ogoshi | 219/86.25 |
| 2010/0159269 A1 * | 6/2010 | Matlack et al. | 428/615 |

FOREIGN PATENT DOCUMENTS

| | | |
|---|---|---|
| JP | 2000-246467 | 9/2000 |
| JP | 2001-314982 | 11/2001 |
| JP | 2001-321966 | 11/2001 |
| JP | 2002-11583 | 1/2002 |
| JP | 2002-120076 | 4/2002 |
| JP | 3429475 | 7/2003 |
| JP | 2003-245783 | 9/2003 |
| JP | 3516913 | 4/2004 |
| JP | 2005-152909 | 6/2005 |
| JP | 3732448 | 1/2006 |

OTHER PUBLICATIONS

Written Opinion of the International Searching Authority issued Jan. 18, 2011 in International (PCT) Application No. PCT/JP2010/072646 with English translation.

Sakano et al., "Development of Spot FSW Robot System for Automobile Body Members", Friction Stir Welding, Third International Symposium, Sep. 27-28, 2001.

Tokisue et al., "Applications of Friction Stir Welding into Light Metals", Journal of Japan Institute of Light Metals, vol. 49, No. 6, 1999, pp. 258-262 with concise explanation of relevance.

Shinoda et al., "Study of Friction Stir Welding", Preprints of the National Meeting of JWS, 62, 1998, pp. 210-211 with concise explanation relevance.

* cited by examiner (A)

(B)

FRICTION STIR SPOT WELDING DEVICE AND MEMBER SUPPORT THEREFOR

BACKGROUND OF THE INVENTION

1. Field of the Invention

The present invention relates to a friction stir spot welding device that rotates a rotary tool to perform friction stir spot welding of work-pieces, and a member support therefor.

2. Description of the Related Art

A friction stir welding method is the technique of inserting a probe provided at the tip of a tool into work-pieces while rotating the tool, and performing welding of the work-pieces by the plastic flow caused by the frictional heat that is generated between the rotary tool and the work-pieces.

As a technique of enhancing the welding reliability of this friction stir welding, for example, there is the technique described in Japanese Publication No. 2000-246467.

In the technique described in Japanese Publication No. 2000-246467, the angle of the front surface of the coupling target member with respect to a plane perpendicular to the central axis of rotation of the rotary tool is tilted within a range of 3° to 30°, to promote the plastic flow of the work-pieces.

SUMMARY OF THE INVENTION

1. Problem to be Solved by the Invention

As described above, there is the technique of tilting the surface of the coupling target member with respect to the plane perpendicular to the central axis of rotation of the rotary tool in order to promote the plastic flow of the work-pieces. However, in the friction stir spot welding, as shown in FIG. 16, if a coupling target member 10 tilts to the plane perpendicular to the central axis of rotation Ac of a rotary tool 20, a triangular gap S is formed between a surface 39 of a member support 30f that supports the work-pieces 10 and a back surface 11 of the work-pieces 10. For this reason, as shown in FIG. 17, the plastically fluidized material flows into the gap between the triangular shape in the process of the friction stir welding, and a triangular projection 19 corresponding to this gap shape is formed on the member support of the work-pieces 10 after friction stir welding. Thus, there is a problem in that the surface of the work-pieces 10 on the member support side, that is, the back surface 11 cannot be finished as a smooth surface.

Thus, the invention overcomes such problems of the related technique, and an object thereof is to provide a friction stir spot welding device and a member support therefor that can smoothly finish the back surface of work-pieces.

2. Means for Solving the Problem

The friction stir spot welding device for solving the above problems is a friction stir spot welding device that moves a rotary tool in a direction in which the central axis of rotation of the rotary tool extends while rotating the rotary tool around the central axis of rotation, to perform friction stir spot welding of work-pieces. The friction stir spot welding device includes a member support that supports the work-pieces and a frame that supports the member support, the member support has a backing piece having a bearing surface that contacts the work-pieces, and a supporting body that supports the backing piece such that the backing piece tilts with the tilting of the work-pieces, which is in contact with the bearing surface. In the backing piece, the amount of change in the position of the bearing surface on the extension line of the central axis of rotation between a state in which the bearing surface is in a reference state perpendicular to the central axis of rotation and a state in which the bearing surface tilts in response to the tilting of the work-pieces, is less than or equal to a predetermined embedding amount with which a shoulder part of the rotary tool is embedded in the work-pieces.

In this device, even if the work-pieces are placed on the backing piece of the member support in a tilting state, the backing piece tilts with the tilting of the work-pieces. For this reason, a gap is not formed between the back surface of the work-pieces and the bearing surface of the backing piece. Hence, in this device, a material resulting from the work-pieces being plastically fluidized does not flow into a gap between the back surface of the tilting work-pieces and the front surface of the member support unlike the related art, and the back surface of the work-pieces can be smoothly finished.

Additionally, in this device, even in a case where the backing piece and the work-pieces tilt at the maximum permissible tilting angle, the intersection between the extension line of the central axis of rotation of the rotary tool and the shoulder surface of the rotary tool can be located at least on the front surface of the work-pieces, and degradation of the welding reliability of the work-pieces can be prevented.

Here, in the friction stir spot welding device, in the backing piece, a curved surface including an arc forms a facing surface that faces the supporting body.

In this device, since the facing surface of the backing piece is a curved surface including an arc, the backing piece can smoothly tilt with respect to the supporting body.

Additionally, in the friction stir spot welding device, the relationship between the radius of the arc of the backing piece and the height of the backing piece based on the bearing surface may satisfy the following condition.

Condition: the amount of change in the position of the bearing surface when the bearing surface is in the reference state where the symmetrical axis of the backing piece is located on the extension line of the central axis of rotation and when a symmetrical axis of the backing piece forms a maximum permissible tilting angle with respect to the central axis of rotation, in a case where the tilting angle of the front surface of the work-pieces with respect to a plane perpendicular to the central axis of rotation of the rotary tool, which is a tilting angle permitted by friction stir spot welding, is defined as the maximum permissible tilting angle is less than or equal to the embedding amount.

Additionally, in the friction stir spot welding device, the backing piece may form a spherical crown shape in which a portion of a sphere is cut away, and the planar surface of the spherical crown shape forms the bearing surface.

Additionally, another friction stir spot welding device for solving the above problems is a friction stir spot welding device that moves in a direction in which the central axis of rotation of a rotary tool extends while rotating the rotary tool around the central axis of rotation, to perform friction stir spot welding of work-pieces. The friction stir spot welding device includes a member support that supports the work-pieces and a frame that supports the member support. The member support has a backing piece having a bearing surface that contacts the work-pieces, and a supporting body that supports the backing piece such that the backing piece tilts with the tilting of the work-pieces, which is in contact with the bearing surface. The backing piece forms a semicircular cross-sectional shape, a surface equivalent to the chord of the semicircle forms the bearing surface, and a surface equivalent to the arc of the semicircle forms a facing surface that faces the supporting body.

Also in this device, similarly to the above device, even if the work-pieces are placed on the backing piece of the member support in a tilting state, the backing piece tilts with the tilting of the work-pieces. For this reason, a gap is not formed between the back surface of the work-pieces and the bearing surface of the backing piece. Hence, in this device, a material resulting from the work-pieces being plastically fluidized does not flow into a gap between the back surface of the tilting work-pieces and the front surface of the member support unlike the related art, and the back surface of the work-pieces can be smoothly finished. Moreover, in this device, even in a case where the backing piece and the work-pieces tilt at the maximum permissible tilting angle, the intersection between the extension line of the central axis of rotation of the rotary tool and the shoulder surface of the rotary tool can be located at least on the front surface of the work-pieces, and degradation of the welding reliability of the work-pieces can be prevented.

Here, in the above friction stir spot welding device, the backing piece may have a semi-spherical shape or a semi-columnar shape.

Additionally, in the friction stir spot welding device, the maximum width dimension of the bearing surface may be equal to or greater than the external diameter dimension of the shoulder part of the rotary tool.

In this device, the load applied to the work-pieces from the shoulder part of the rotary tool can be stably supported. Moreover, in this device, the whole portion, which forms the back surface of the work-pieces, in a plastic flow region of the work-pieces can be reliably supported by the bearing surface of the backing piece.

Additionally, in the friction stir spot welding device, the supporting body may have a plurality of rollers that comes into rolling contact with the facing surface of the backing piece.

In this device, the backing piece can be smoothly tilted with respect to the supporting body.

Additionally, in the friction stir spot welding device, the supporting body may be formed with a recess that at least a portion of the facing surface of the backing piece enters, and the inner surface of the recess may form a surface shape corresponding to the facing surface that is a curved surface, and may form a sliding surface that comes into sliding contact with the facing surface.

In this device, since the configuration of the member support is simplified, the manufacturing costs of the device can be kept down.

Additionally, in the friction stir spot welding device, one surface of the sliding surface of the supporting body and the facing surface of the backing piece may be formed with a groove for passing a cooling medium between both the surfaces and the outside.

In this device, the backing piece and the work-pieces that are in contact with this backing piece can be cooled by flowing a cooling medium into the groove.

Additionally, in the friction stir spot welding device, cooling medium supply means for supplying a cooling medium may be provided between the supporting body and the facing surface of the backing piece.

In this device, the backing piece and the work-pieces that are in contact with this backing piece can be cooled.

Additionally, in the friction stir spot welding device, the cooling medium supply means may be a means for suctioning gas outside the supporting body and the backing piece into the supporting body from between the supporting body and the facing surface of the backing piece from the outside of the supporting body and the backing piece, and then exhausts the gas to the outside of the supporting body.

In this device, dropping off of the backing piece from the supporting body can be prevented by sucking the backing piece to the supporting body side.

Additionally, the friction stir spot welding device may further include supporting body cooling means for cooling the supporting body.

In this device, the backing piece and the work-pieces that are in contact with this backing piece can be cooled.

Additionally, in the friction stir spot welding device, one of the backing piece and the supporting body may have a magnetic body and the other have a magnet that attracts the magnetic body on the one side.

In this device, dropping off of the backing piece from the supporting body can be prevented by attraction of the magnet.

Additionally, the friction stir spot welding device may further include pressing means for pressing the work-pieces against the bearing surface of the backing piece from a plurality of symmetrical positions based on the central axis of rotation of the rotary tool.

In this device, even if the work-pieces and the backing piece tilt when the work-pieces is placed on the backing piece, the work-pieces is pressed against the bearing surface of the backing piece from a plurality of symmetrical positions based on the central axis of rotation of the rotary tool by the pressing means. Therefore, the tilting of the work-pieces and the backing piece can be made small.

Additionally, the member support for friction stir spot welding for solving the above problems is a member support for friction stir spot welding that moves a rotary tool in a direction in which the central axis of rotation of the rotary tool extends while rotating the rotary tool around the central axis of rotation, to supporting a member to be joined when performing friction stir spot welding of the work-pieces. The member support includes a backing piece having a bearing surface that contacts the work-pieces, and a supporting body that supports the backing piece such that the backing piece tilts with the tilting of the work-pieces, which is in contact with the bearing surface. In the backing piece, the amount of change in the position of the bearing surface on the extension line of the central axis of rotation between a state in which the bearing surface is in a reference state perpendicular to the central axis of rotation and a state in which the bearing surface tilts in response to the tilting of the work-pieces, is less than or equal to a predetermined embedding amount with which a shoulder part of the rotary tool is embedded in the work-pieces.

Even in this member support, similarly to the friction stir spot welding device described above, the back surface of the work-pieces can be smoothly finished, and even in a case where the backing piece and the work-pieces tilt at the maximum permissible tilting angle, degradation of the welding reliability of the work-pieces can be prevented.

3. Advantageous Effects of the Invention

According to the present invention, the back surface of the work-pieces can be smoothly finished. Moreover, according to the present invention, even in a case where the backing piece and the work-pieces tilt at the maximum permissible tilting angle, degradation of the welding reliability of the work-pieces can be prevented.

BRIEF DESCRIPTION OF THE DRAWINGS

FIG. 2(A) shows the state during welding processing in a state where the member support does not tilt to a work-pieces, and FIG. 2(B), shows the state during welding processing in a state where the work-pieces tilts.

DETAILED DESCRIPTION OF THE INVENTION

Hereinafter, various embodiments of a friction stir spot welding device according to the present invention will be described with reference to the drawings.

First Embodiment

First, a first embodiment of the friction stir spot welding device according to the present invention will be described with reference to FIGS. 1 to 5.

Figure 5:
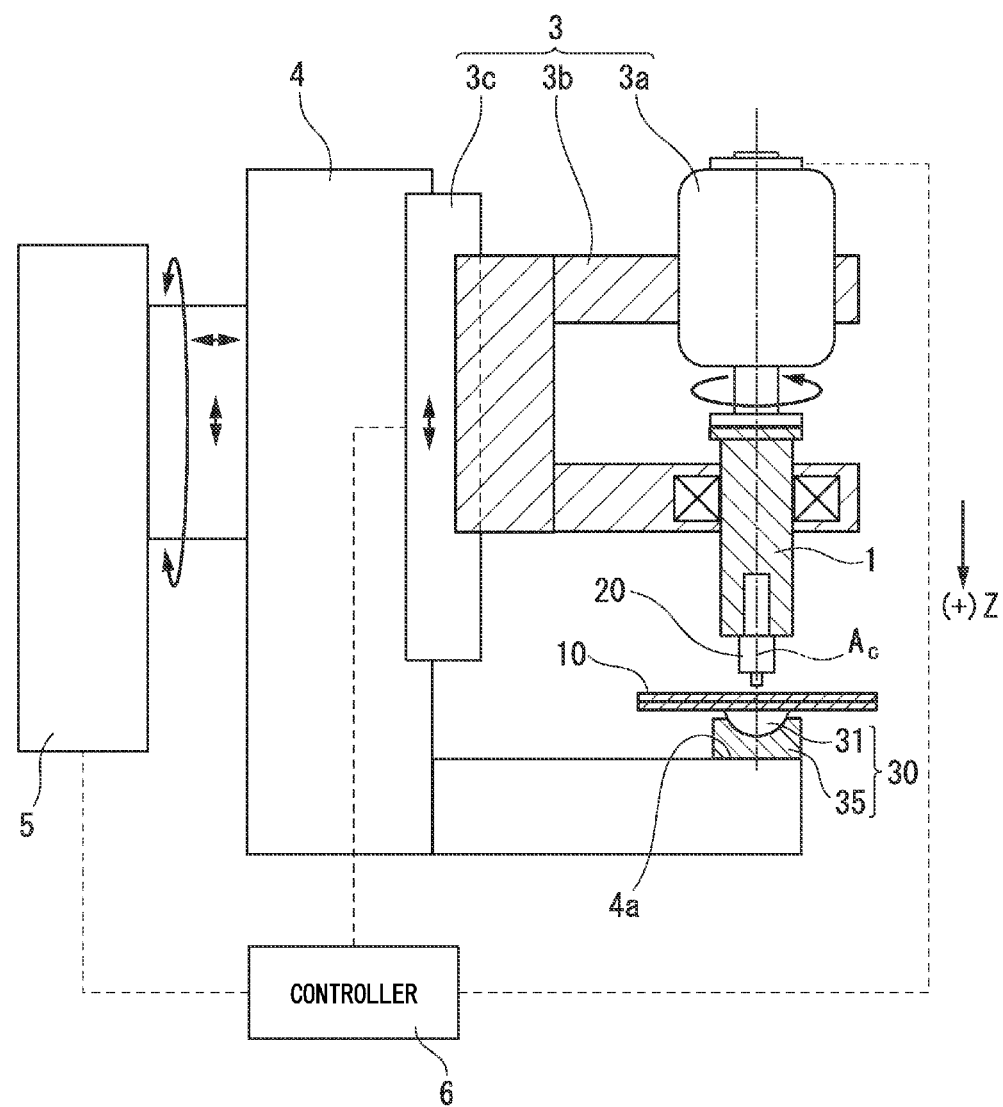
FIG. 5 is a configuration view of the friction stir spot welding device in the first embodiment according to the present invention.

As shown in FIG. 5, the friction stir spot welding device of the present embodiment includes a tool fixture 1 to which a rotary tool 20 is fixed, a tool driving mechanism 3 that rotates the tool fixture 1 and the rotary tool 20 fixed to the tool fixture 1 around the central axis of rotation Ac of the rotary tool 20 and moves the tool fixture and the rotary tool in a tool movement direction Z in which the central axis of rotation Ac extends, a frame 4 on which the tool driving mechanism 3 is mounted, a frame moving mechanism 5 that rotates the frame 4 and moves the frame in two directions that are perpendicular to each other within a three-dimensional space, a member support 30 that supports work-pieces 10, and a controller 6 that controls the operation of the tool driving mechanism 3 or the frame moving mechanism 5.

The tool driving mechanism 3 has a tool rotating machine 3a including a motor that rotates the rotary tool 20 fixed to the tool fixture 1 around the central axis of rotation Ac, a supporting frame 3b that supports the tool fixture 1 so as to be rotatable around the central axis of rotation Ac of the rotary tool 20 and a casing of the tool rotating machine 3a fixed thereto, and a tool moving machine 3c that moves the supporting frame 3b in the tool movement direction.

The frame 4 is formed with a welding load receiving part 4a that supports the member support 30 on an extension line of the central axis of rotation Ac of the rotary tool 20.

Figure 1:
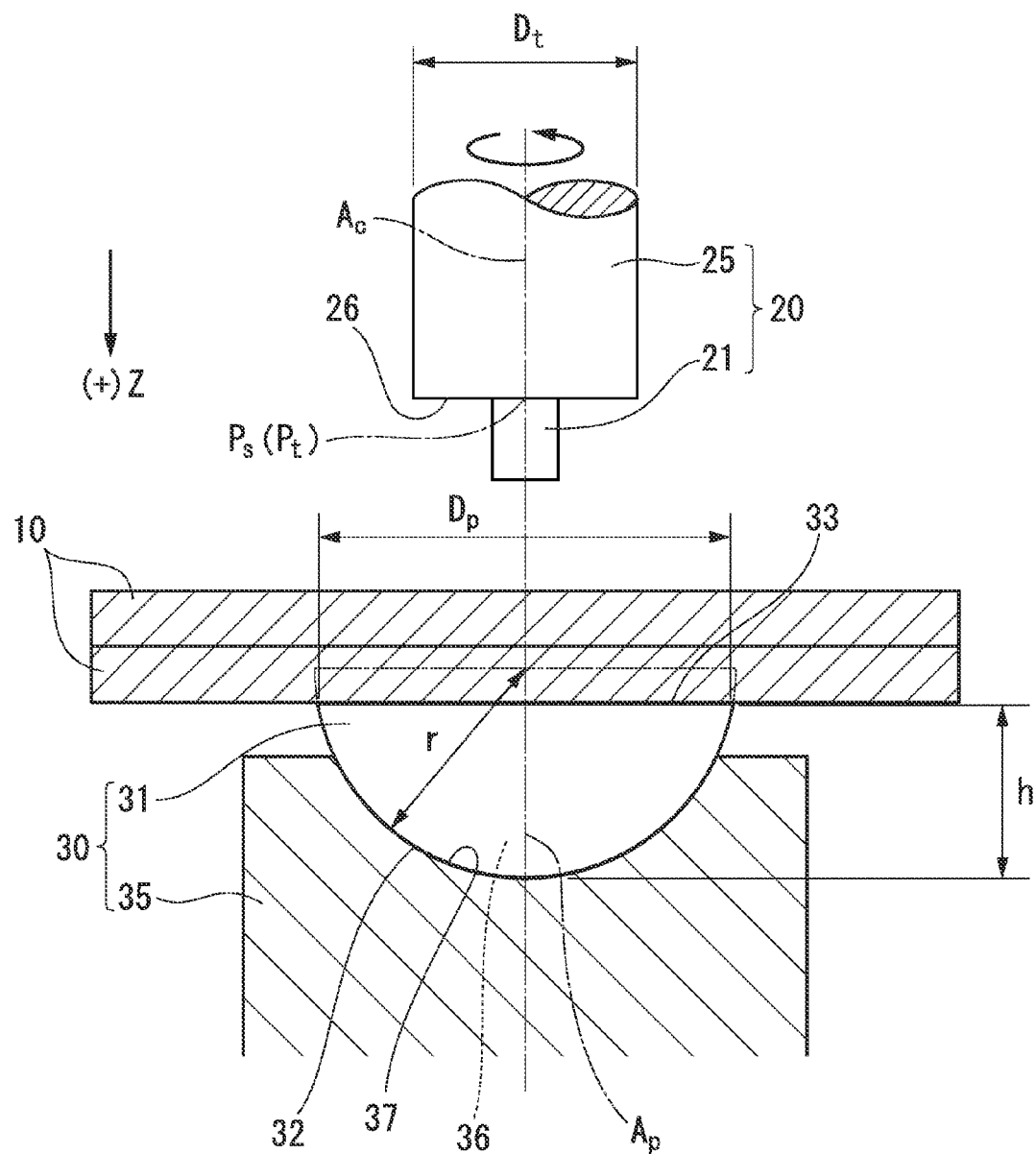
FIG. 1 is a cutaway side view of main parts of a member support in a first embodiment according to the present invention.
Figure 2:
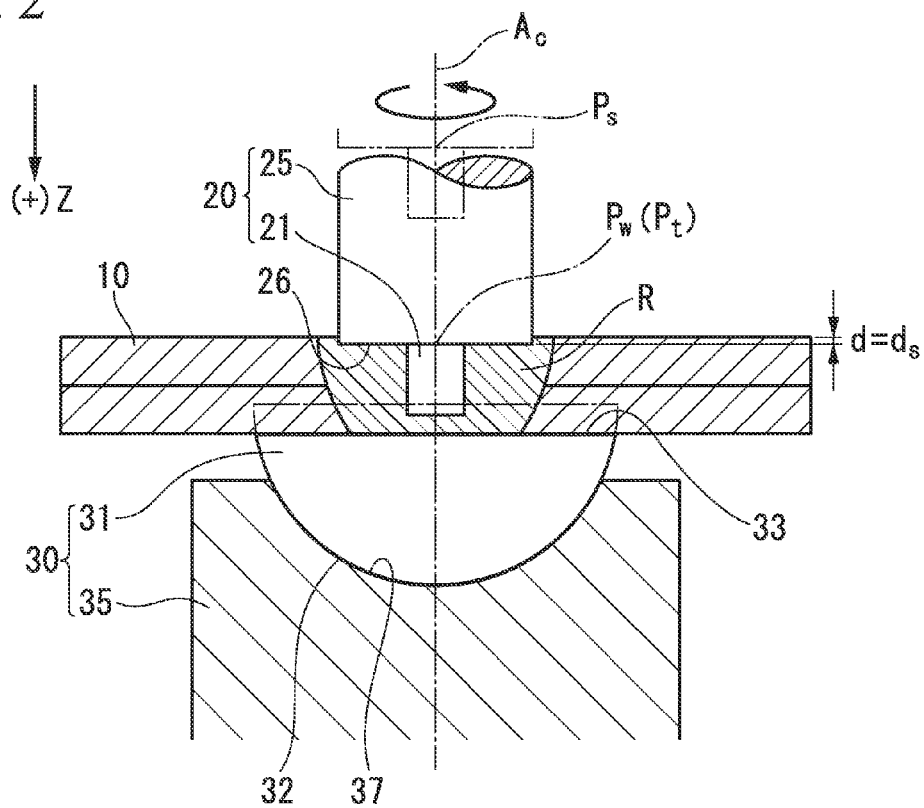
FIG. 2 is an explanatory view showing the state of the member support during welding processing in the first embodiment according to the present invention.
Figure 2:
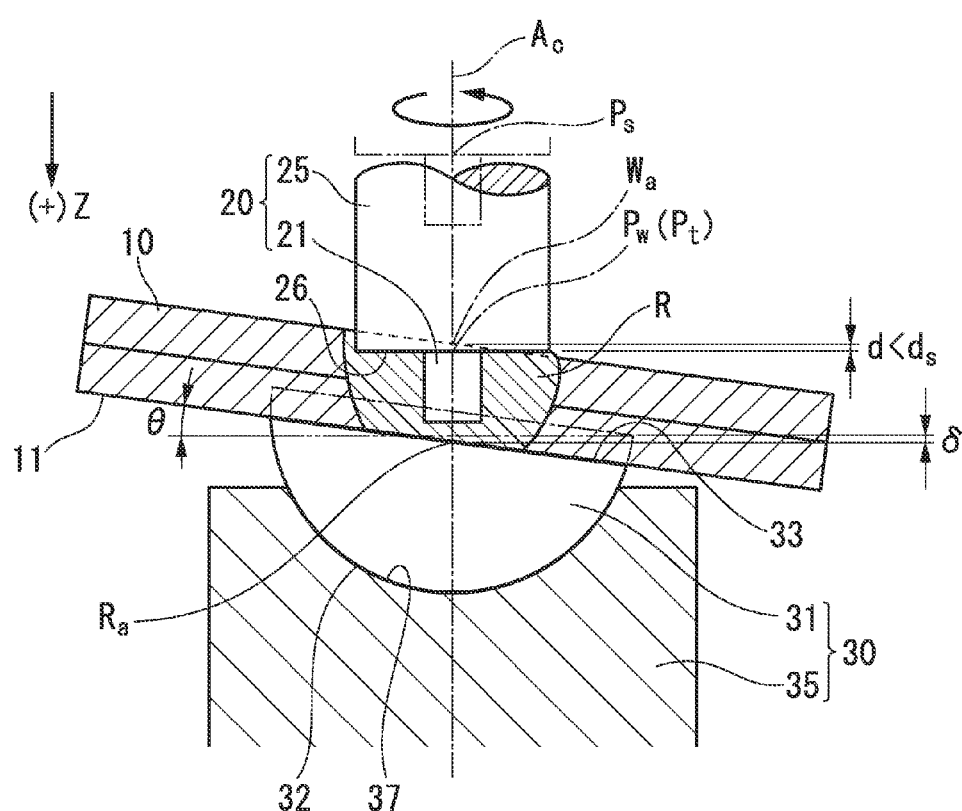

As shown in FIG. 1, the member support 30 has a backing piece 31 having a bearing surface 33 that contacts the work-pieces 10, and a supporting body 35 that supports the backing piece 31 such that the backing piece 31 tilts with the tilting of the work-pieces 10, which is in contact with the bearing surface 33.

The backing piece 31 forms a spherical crown shape in which a portion of a sphere is cut away, the planar surface of this spherical crown shape forms the bearing surface 33, and the spherical surface of this spherical crown shape forms a facing surface 32 that faces the supporting body 35. The height h from the bearing surface 33 to the facing surface 32 is smaller than the radius r of the facing surface 32 that is a spherical surface. In addition, in the present embodiment, the radius r of the facing surface 32 is, for example, 20 mm.

The supporting body 35 is formed with a recess 36 that at least a portion of the facing surface 32 of the backing piece 31 enters. The inner surface of this recess 36 has a spherical shape corresponding to the facing surface 32 of the backing piece 31, and forms a sliding surface 37 on which the facing surface 32 of the backing piece 31 slides. The supporting body 35 is fixed to the welding load receiving part 4a (shown in FIG. 5) of the frame 4.

Here, a state where the bearing surface 33 of the backing piece 31 is perpendicular to the central axis of rotation Ac of the rotary tool 20 is adopted as a reference state of the backing piece 31 fixed to the tool fixture 1. In this reference state, a symmetrical axis Ap of the spherical crown-shaped backing piece 31 is located on the extension line of the central axis of rotation Ac of the rotary tool 20. Additionally, for convenience of the following description, a direction parallel to the central axis of rotation Ac of the rotary tool 20 fixed to the tool fixture 1 is defined as a Z direction. In this Z direction, a backing piece 31 side with respect to the rotary tool 20 is defined as a (+)Z side, and a side opposite to the backing piece side is defined as a (−)Z side.

The rotary tool 20 has a cylindrical shoulder part 25 and a probe part 21 that protrudes from a shoulder surface 26 that is an end face of the shoulder part 25. The external diameter of the bearing surface 33 of the backing piece 31 is equal to or greater than the external diameter of the shoulder part 25 of the rotary tool 20. In addition, although the shoulder part 25 and the probe part 21 rotate integrally in the present embodiment, both do not necessarily rotate integrally.

As shown in FIG. 1, the external diameter Dp of the bearing surface 33 of the backing piece 31 mentioned above is a dimension equal to or greater than the external diameter Dt of the shoulder part 25 of the rotary tool 30. For example, the external diameter Dt of the shoulder part is 20 mm, and the external diameter of the bearing surface is 39 mm.

Next, the operation of the friction stir spot welding device described above will be described. In addition, overlapping spot welding of two members 10 to be welded will be described below as an example.

First, as shown in FIG. 5, an operator fixes the rotary tool 20 to the tool fixture 1 of the friction stir spot welding device, overlaps two members 10 to be welded, and places this on the bearing surface 33 of the backing piece 31.

Next, the operator performs initial setting of the friction stir spot welding device. In this initial setting, origin adjustment of the rotary tool 20 and input processing of various parameters are performed.

In the input processing of various parameters, the length of the probe part 21, the external diameter of the probe part 21, the external diameter Dt of the shoulder part 25, the rotating speed of the rotary tool 20, an initial tool position Ps that is the operation starting position of the rotary tool 20, a welding tool position Pw that is the position of the rotary tool 20 during welding, and the residence time of the rotary tool 20 at the welding tool position Pw, and the like are input to the controller 6. In addition, as shown in FIG. 1, the position input as the position of the rotary tool 20 is the position Pt of an intersection between the central axis of rotation Ac of the rotary tool 20 and the shoulder surface 26, but may be an intersection between the central axis of rotation Ac of the rotary tool 20 and the tip of the probe part 21.

As shown in FIG. 2(A), the welding tool position Pw is a position where the shoulder part 25 of the rotary tool 20 is embedded in the work-pieces 10 by a predetermined amount of embedding (hereinafter referred to as setting amount of embedding) ds, on the extension line of the central axis of rotation Ac of the rotary tool 20 at the initial tool position Ps. The shoulder part 25 is embedded in the work-pieces 10 in this way in order that the shoulder surface 26 reliably contacts the work-pieces 10, to generate frictional heat with the work-pieces 10 even in the shoulder surface 26 to expand a plastic flow region in the work-pieces 10. In addition, the set amount of embedding ds is, for example, 0.1 mm.

As described above, if the initial setting is completed and the operator gives a welding start instruction to the controller 6, the tool moving machine 3c is driven to locate the rotary tool 20 at the initial tool position Ps. Then, if the rotary tool 20 reaches the initial tool position Ps, the tool rotating machine 3a is driven to rotate the rotary tool 20 fixed to the tool fixture 1, and the rotary tool 20 is slowly moved toward the (+) Z side from the initial tool position Ps to the welding tool position Pw by the tool moving machine 3c.

In the movement process of the rotary tool 20, the probe part 21 of the rotary tool 20 enters the work-pieces 10 while rotating. Then, if the rotary tool 20 reaches the welding tool position Pw, the rotary tool 20 resides at this position while rotating for the residence time determined in initial setting. If the residence time passes, the rotary tool 20 returns to the initial tool position Ps from the welding tool position Pw while rotating.

As shown in FIG. 2(A), if neither the backing piece 31 nor the work-pieces 10 tilts at the reference position when the rotary tool 20 reaches the welding tool position Pw, the backing piece 31, the shoulder surface 26 of the rotary tool 20 will be embedded by the set amount of embedding ds from the front surface of the work-pieces 10 at an early stage in any position.

If the probe part 21 and the shoulder surface 26 that are rotating, and the work-pieces 10 contact each other, frictional heat is generated between both, and the work-pieces 10 around the probe part 21 and in the vicinity of the shoulder surface 26 flows plastically due to this frictional heat, and a plastic flow region R is formed. The plastic flow region R becomes gradually large in the process in which the rotary tool 20 resides at the welding tool position Pw for the residence time.

If the rotary tool 20 is pulled up from the work-pieces 10, the plastic flow region R hardens gradually, and the two members 10 to be welded is spot-welded in a location that has been the plastic flow region R.

Additionally, as shown in FIG. 2(B), if the front surface of the work-pieces 10 tilts with respect to a perpendicular plane of the central axis of rotation Ac of the rotary tool 20, and is placed on the bearing surface 33 of the backing piece 31, the backing piece 31 tilts from the reference state in response to the tilting of the work-pieces 10. That is, the backing piece 31 tilts by the same angle θ at which the work-pieces 10 tilts, and a gap is not formed between the back surface 11 of the work-pieces 10 and the bearing surface 33 of the backing piece 31.

Then, if the rotary tool 20 reaches the welding tool position Pw, similarly to the aforementioned case, the rotary tool 20 resides at the welding tool position Pw for the residence time and is then pulled out from the work-pieces 10.

If the rotary tool 20 reaches the welding tool position Pw in a state where the work-pieces 10 and the backing piece 31 tilt, the amount of embedding d from the surface of the work-pieces 10 becomes larger than the set amount of embedding ds on one side of the shoulder surface 26 of the rotary tool 20 with reference to the central axis of rotation Ac, the amount of embedding d from the front surface of the work-pieces 10 become less than the set amount of embedding ds, on the other side of the shoulder surface with reference to the central axis of rotation Ac, and the shoulder surface may not contact the surface of the work-pieces 10 depending on the case.

In the above process, a portion around the rotary tool 20 flows plastically in the work-pieces 10, and a plastic flow region is formed in a way similar to the aforementioned case.

Although this plastic flow region reaches even the back surface 11 of the work-pieces 10, the whole bearing surface 33 of the backing piece 31 is in contact with the back surface 11 of the work-pieces 10. Moreover, as described with reference to FIG. 1, the external diameter Dp of the bearing surface 33 is equal to or greater than the shoulder diameter Dt of the rotary tool 20, and as shown in FIG. 2(B), the bearing surface 33 of the backing piece 31 is in contact with the whole portion that forms the back surface 11, in the plastic flow region R of the work-pieces 10.

Figure 4:
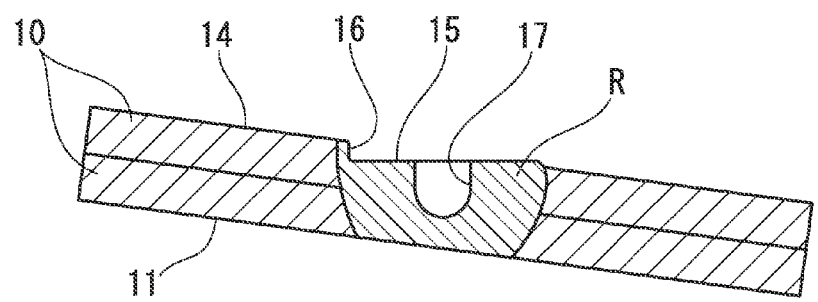
FIG. 4 is an explanatory view showing the state of the work-pieces after the work-pieces is welded in a tilting state, in the friction stir spot welding device in the first embodiment according to the present invention.

For this reason, as shown in FIG. 4, the back surface 11 of the work-pieces 10 can be made smooth and flat even after this plastic flow region R hardens, similarly to a state before welding of the work-pieces 10. However, an inclination surface 15 corresponding to the shoulder surface of the rotary tool that inclines relative to the front surface 14, a step 16 from the surface 14 to the inclination surface 15, and a probe hole 17 as a trace of the probe part of the rotary tool are formed on the surface 14 that is a (−)Z-side surface of the work-pieces, similarly to the related art described with reference to FIG. 17.

Incidentally, as described with reference to FIG. 1, when the height h from the bearing surface 33 of the backing piece 31 to the facing surface 32 thereof is smaller than the radius r of the facing surface 32 that is a spherical surface, if the backing piece 31 tilts as shown in FIG. 2(B), the position Ra of the bearing surface 33 on the extension line of the central axis of rotation Ac of the rotary tool 20 moves to the (+)Z side by δ, compared to the reference state. For this reason, if the backing piece 31 tilts, the position Wa of the front surface of the work-pieces 10 on the extension line of the central axis of rotation Ac of the rotary tool 20 also moves to the (+)Z side by δ. On the other hand, since the welding tool position Pw of the rotary tool 20 is still an initial setting value irrespective of the state of the backing piece 31, when the rotary tool 20 is at the welding tool position Pw, the position Pt on the shoulder surface 26 on the central axis of rotation Ac is a position that is less than the set amount of embedding ds from the front surface of the work-pieces 10, specifically, a position of (setting amount of embedding −δ). That is, when the rotary tool 20 is at the welding tool position Pw, the amount of embedding d at the position Pt on the shoulder surface 26 on the central axis of rotation Ac is less than the set amount of embedding ds.

When the backing piece 31 is in the reference state in this way, the amount of embedding d becomes the set amount of embedding ds. However, when the backing piece 31 tilts, the amount of embedding d is less than or equal to the set amount of embedding ds. For this reason, the set amount of embedding ds is an amount by which the shoulder part 25 of the rotary tool 20 should be embedded in the work-pieces 10 when the backing piece 31 is in the reference state.

The amount of change δ in position on the extension line of the central axis of rotation Ac of the rotary tool 20 on the bearing surface 33 of the backing piece 31 becomes large as the tilting angle θ of the backing piece 31 becomes large. For this reason, if the tilting angle θ of the backing piece 31 becomes large and the amount of change δ in the position of the bearing surface 33 becomes larger than the set amount of embedding ds, the portion of an intersection Pt between the extension line of the central axis of rotation Ac of the rotary tool 20 and the shoulder surface 26 stops entering the work-pieces 10. In this case, the portion of the shoulder surface 26 that contacts the work-pieces 10 becomes less than half of the whole shoulder surface 26. Moreover, the load applied to the work-pieces 10 from the shoulder part 25 of the rotary tool 20 is not applied on the central axis of rotation Ac of the rotary tool 20, and the adhesion property between the two members 10 to be welded degrades.

Hence, if the backing piece 31 tilts together with the work-pieces 10 and the portion of the intersection Pt between the extension line of the central axis of rotation Ac of the rotary tool 20 and the shoulder surface 26 stops entering the work-pieces 10, the welding reliability of the work-pieces 10 degrades.

Thus, in the present embodiment, the intersection Pt between the extension line of the central axis of rotation Ac of the rotary tool 20 and the shoulder surface 26 is adapted to be capable of being located at least on the front surface of the work-pieces 10 by imposing the following conditions on the various dimensions of the backing piece 31.

Here, the tilting angle θ of the front surface of the work-pieces 10 with respect to a plane perpendicular to the central axis of rotation Ac of the rotary tool 20, which is a tilting angle permitted by friction stir spot welding, is defined as a maximum permissible tilting angle θmax. The maximum permissible tilting angle θmax is an angle at which the welding reliability of the work-pieces 10 degrades markedly if the tilting angle θ is increased more than this maximum permissible tilting angle, specifically, 30°. Additionally, the amount of change in the position of the bearing surface 33 of the backing piece 31 on the extension line of the central axis of rotation Ac of the rotary tool 20 when the backing piece 31 is in the reference state and when the backing piece 31 tilts at the maximum permissible tilting angle θmax is defined as δ.

Figure 3:
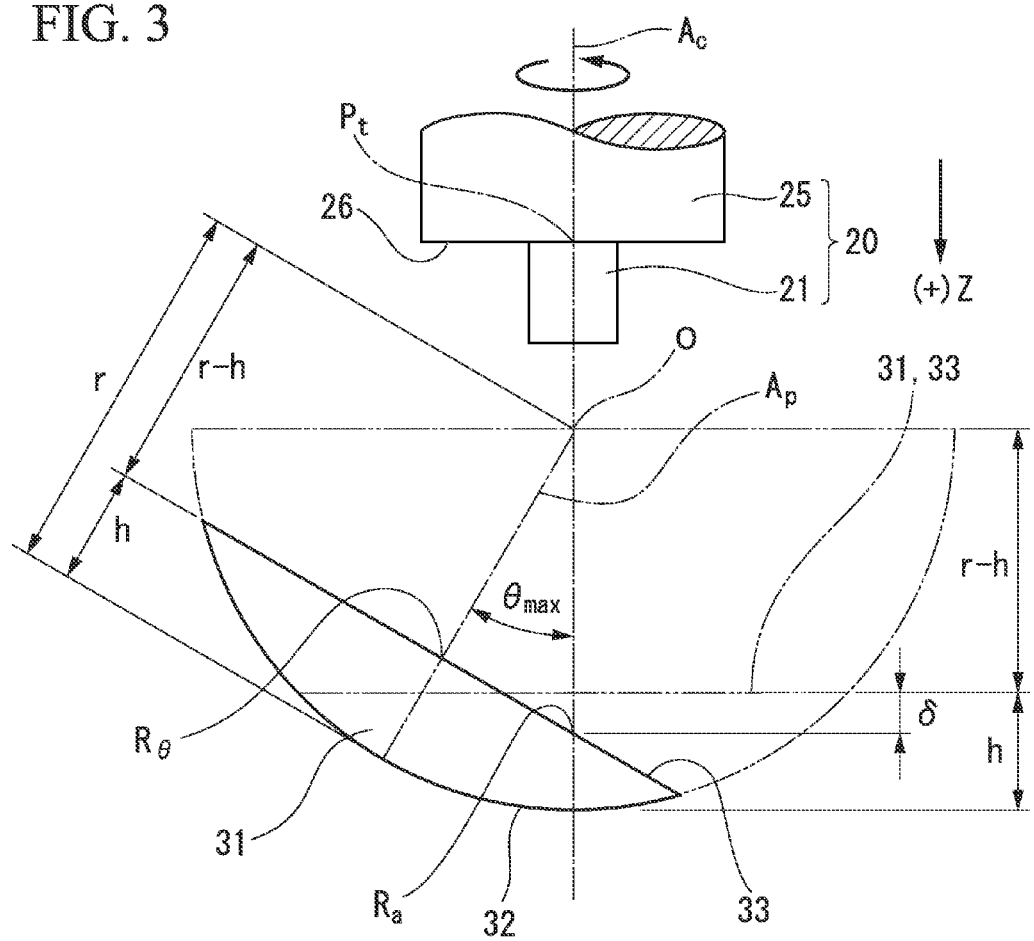
FIG. 3 is an explanatory view illustrating the mutual relationship of respective dimensions of the backing piece in the first embodiment according to the present invention.

As shown in FIG. 3, if attention is paid to a triangle Rθ-O-Ra that is formed by connecting an intersection RO between the bearing surface 33 of the backing piece 31 and a symmetrical axis Ap of the backing piece 31, a sphere center O of the facing surface 32 of the backing piece 31, an intersection Ra between the bearing surface 33 of the backing piece 31 and the extension line of the central axis of rotation Ac of the rotary tool 20 when the backing piece 31 tilts at the maximum permissible tilting angle θmax from the reference state, the following (Formula 1) is established.

$$\cos\theta\max = (r-h)/\{(r-h)+\delta\} \qquad \text{(Formula 1)}$$

r: radius of backing piece 0, and h: height of backing piece.

If this (Formula 1) is solved by the amount of change δ in the position, the following (Formula 2) is obtained.

$$\begin{aligned}\delta &= (r-h)/\cos\theta\max - (r-h) \\ &= (r-h)\times(1-\cos\theta\max)/\cos\theta\max \\ &= (r-h)\times(1-\cos\theta\max)/\cos\theta\max\end{aligned} \qquad \text{(Formula 2)}$$

The amount of change δa in position needs to be less than or equal to the set amount of embedding ds, as shown in the following (Formula 3), in order that the intersection Pt between the extension line of the central axis of rotation Ac of the rotary tool 20 and the shoulder surface 26 can be located at least on the front surface of the work-pieces when the backing piece 31 tilts at the maximum permissible tilting angle θmax.

$$ds \geq \delta \qquad \text{(Formula 3)}$$

Hence, as for the aforementioned condition provided in order that the intersection Pt between the extension line of the central axis of rotation Ac of the rotary tool 20 and the shoulder surface 26 can be located at least on the front surface of the work-pieces when the backing piece 31 tilts at the maximum permissible tilting angle θmax, the following (Formula 4) is established from the above (Formula 2) and (Formula 3).

$$ds \geq (r-h)\times(1-\cos\theta\max)/\cos\theta\max \qquad \text{(Formula 4)}$$

Here, since the set amount of embedding ds is 0.1 mm as mentioned above, and the maximum permissible tilting angle θmax is 30°, the difference (r−h) between the radius r and height h of the backing piece 31 becomes less than or equal to 0.646 mm as in the following (Formula 5), from (Formula 4).)

$$0.1 \geq (r-h)\times(1-\cos 30°)/\cos 30°$$

$$r-h-0.646 \text{ (mm)} \qquad \text{(Formula 5)}$$

Accordingly, in the case of the present embodiment, the radius r of the backing piece 30 is 20 mm as mentioned above. Therefore, in order to satisfy the above conditions, the height h of the rotary tool 20 needs to be equal to or greater than 19.354 mm. For this reason, in order to satisfy the above conditions, it is required that the rotary tool 20 has a semi-sphere in which the radius r and height h of the rotary tool 20 are equal, or a shape close to the semi-sphere with no limit.

Hence, in the present embodiment, the relationship between the radius r and height h of the backing piece 30 is set so as to satisfy the above (Formula 4). Therefore, even in a case where the rotary tool 20 and the work-pieces 10 tilt at the maximum permissible tilting angle θmax, the intersection Pt between the extension line of the central axis of rotation Ac of the rotary tool 20 and the shoulder surface 26 can be located at least on the front surface of the work-pieces 10, and degradation of the welding reliability of the work-pieces 10 can be prevented.

As described above, in the present embodiment, even if the work-pieces 10 tilts, the back surface 11 of the work-pieces 10 can be smoothly and flatly prevented, and degradation of the welding reliability of the work-pieces 10 can be prevented.

Modified Embodiment of the Rotary Tool

Next, a modified embodiment of the rotary tool will be described with reference to FIGS. 6 and 7.

Figure 6:
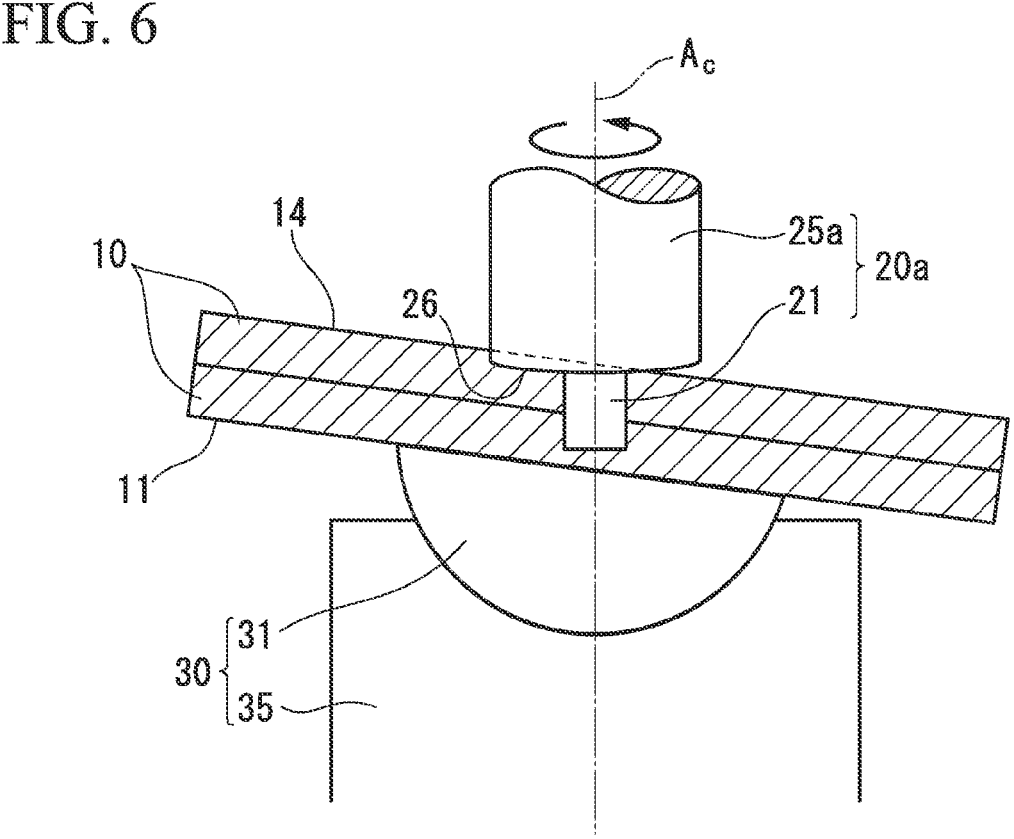
FIG. 6 is an explanatory view showing a rotary tool in a modified example of the first embodiment according to the present invention.

As shown in FIG. 6, the rotary tool 20a of the present modified example also has a shoulder part 25a and the probe part 21, similarly to the rotary tool 20 of the above embodiment.

A shoulder surface 26a of the shoulder part 25a of the present modified example forms a curved surface so as to protrude smoothly in the protruding direction of the probe part 21 as it approaches the central axis of rotation Ac of the rotary tool 20a from the outer edge thereof.

Figure 7:
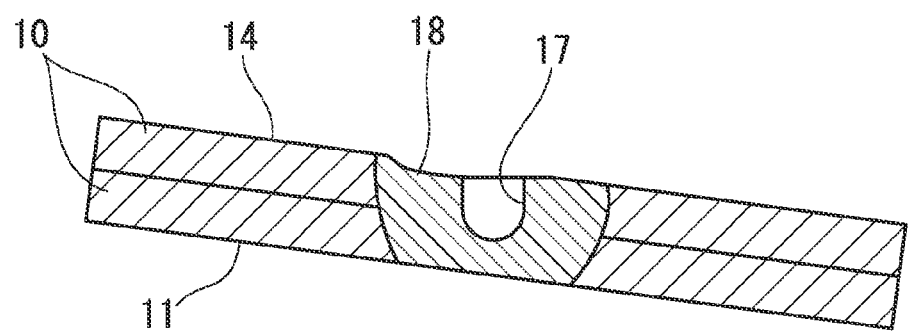
FIG. 7 is an explanatory view showing the state of the work-pieces after the work-pieces is welded in a tilting state using the rotary tool in the modified example of the first embodiment according to the present invention.

For this reason, even if the work-pieces 10 and the backing piece 31 tilt when the work-pieces 10 is placed on the backing piece 31, the rotary tool 20a is used whereby as shown in FIG. 7, a curved surface 18 that is smooth with respect to the surface 14 of the work-pieces 10 is formed on the front surface 14 that is a (−)Z side surface of the work-pieces 10, as a trace of the shoulder surface 26a of the rotary tool 20a.

Figure 14:
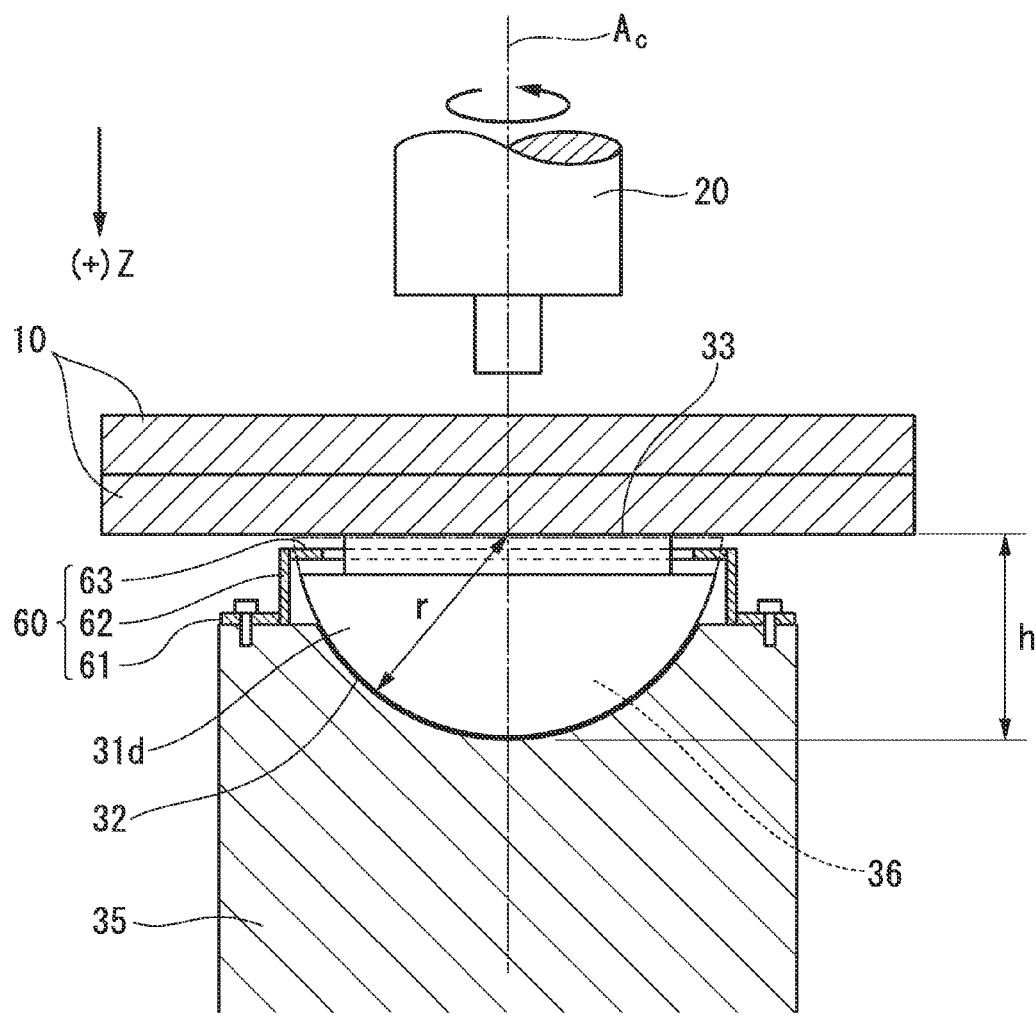
FIG. 14 is a cutaway side view of main parts of a member support in a sixth embodiment according to the present invention.
Figure 17:
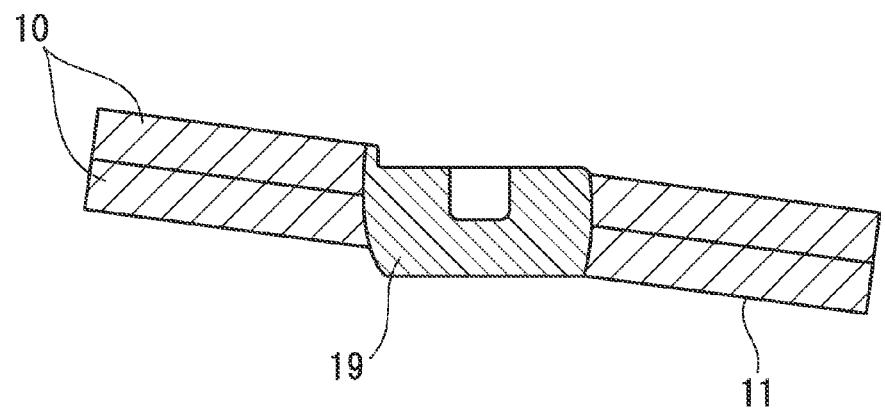
FIG. 17 is an explanatory view showing the state of the work-pieces after the work-pieces in a tilting state, in the related art.

That is, the rotary tool 20a of the present modified example is used whereby the inclination surface 15 that inclines relative to the front surface 14 of the work-pieces 10, and the step 16 from this front surface 14 to the inclination surface 15 are not formed unlike the related art described with reference to FIG. 17 and the first embodiment described with reference to FIG. 14.

Hence, the front surface 14 of the work-pieces 10 can be smoothly and finely finished by using the rotary tool of the present modified example.

Second Embodiment

Next, a second embodiment of the friction stir spot welding device according to the present invention will be described with reference to FIGS. 8 and 9.

Figure 8:
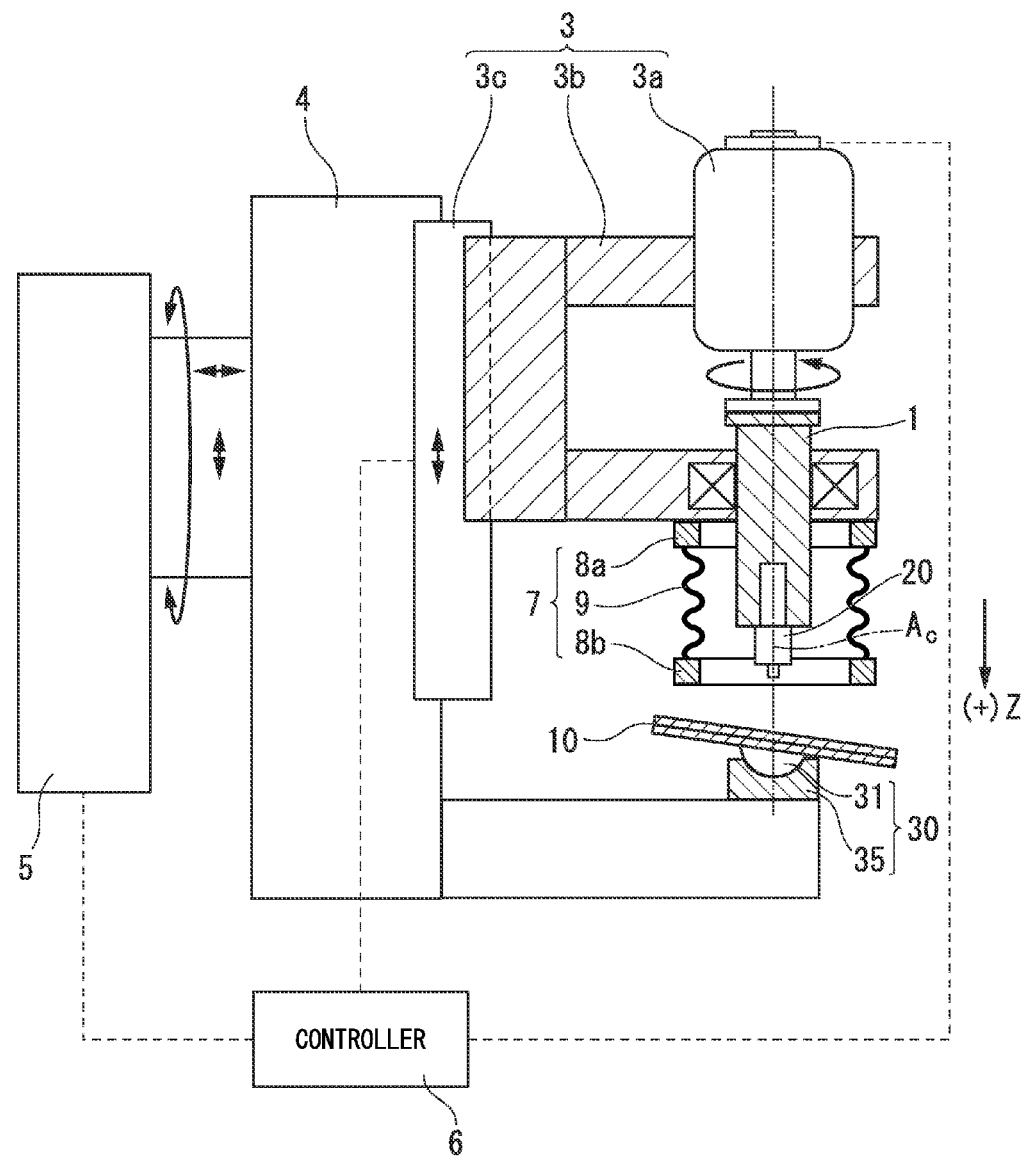
FIG. 8 is a configuration view of a friction stir spot welding device in a second embodiment according to the present invention.

As shown in FIG. 8, the friction stir spot welding device of the present embodiment is obtained by providing the friction stir spot welding device of the first embodiment with a pressing machine 7 that presses the work-pieces 10 against the bearing surface 33 of the backing piece 31.

The pressing machine 7 has a fixed ring 8a that forms a ring shape and is fixed to the supporting frame 3b of the tool driving mechanism 3, a pressing ring 8b that forms a ring shape similarly, and a resilient body 9 that connects the fixed ring 8a and the pressing ring 8b.

The fixed ring 8a is attached to the surface of the supporting frame 3b of the tool driving mechanism 3 closest to the (+)Z side such that the center of the fixed ring 8a is located on the central axis of rotation Ac of the rotary tool 20. Additionally, the pressing ring 8b is arranged such that the internal diameter and external diameter thereof are almost the same as the internal diameter and external diameter of the fixed ring 8a and the center of the pressing ring 8b is located on the central axis of rotation Ac of the rotary tool 20 on the (+)Z side of the fixed ring 8a. The resilient body 9 that connects the fixed ring 8a and the pressing ring 8b is, for example, a spring. The length of the resilient body 9 in the direction of Y is a length such that the pressing ring 8b is located closer to the (+)Z side than the tip of the probe part of the rotary tool 20 in a natural state where the fixed ring 8a and the pressing ring 8b are connected.

The pressing machine 7 is included as in the present embodiment, as shown in FIG. 8, when the work-pieces 10 is placed on the backing piece 31 and the work-pieces 10 and the backing piece 31 are tilted, a portion of the pressing ring 8b contacts the portion tilting the work-pieces 10 that is located on the (−)Z side before the rotary tool 20 contacts the work-pieces 10 in the process in which the rotary tool 20 moves to the welding tool position Pw. If the pressing ring 8b contacts the work-pieces 10, the resilient body 9 of the pressing machine 7 is resiliently deformed. At that time, the pressing machine 7 pushes the portion of the titled work-pieces 10, which is located on the (−)Z side, to the (+)Z side. As a result, the tilting of the work-pieces 10 and the backing piece 31 becomes small.

Figure 9:
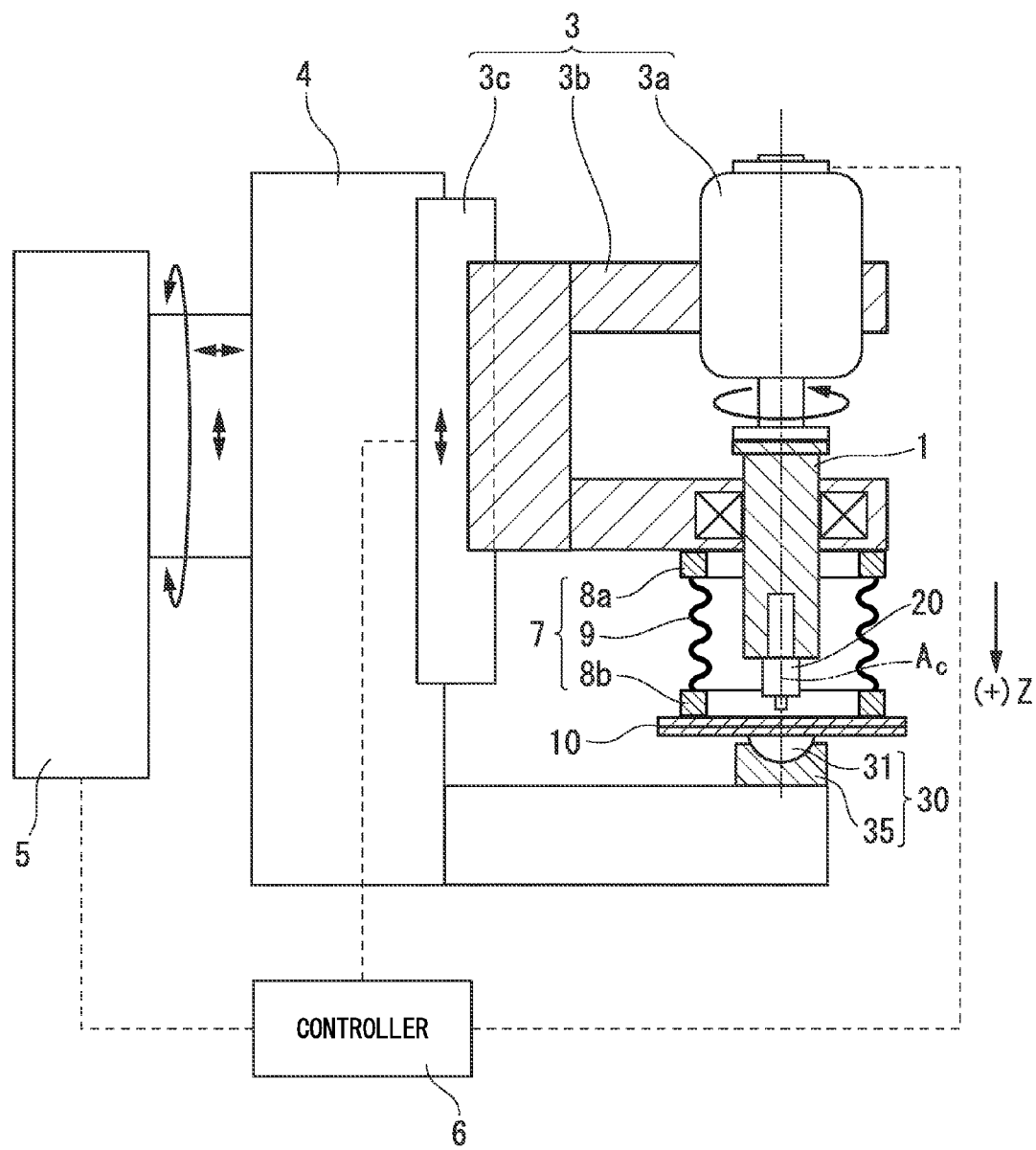
FIG. 9 is an explanatory view showing a state when a tool fixture of the friction stir spot welding device shown in FIG. 8 has moved.

If the rotary tool 20 moves further to the (+)Z side as shown in FIG. 9, the pressing ring 8b also moves with this movement, and the whole surface of the pressing ring 8b on the (+)Z side contacts the work-pieces 10. Hence, the work-pieces 10 is pressed to the (+)Z side from a plurality of symmetrical positions with reference to the central axis of rotation Ac by the pressing ring 8b centered on the extension line of the central axis of rotation Ac of the rotary tool 20. As a result, the tilting of the work-pieces 10 and the backing piece 31 is eliminated or the tilting becomes extremely small.

As described above, in the present embodiment, even if the work-pieces 10 and the backing piece 31 tilt when the work-pieces 10 is placed on the backing piece 31, this tilting can be made small by the pressing machine 7. Thus, degradation of the welding reliability accompanying the tilting of the work-pieces 10 can be suppressed.

Additionally, in the present embodiment, even if the work-pieces 10 and the backing piece 31 tilt when the work-pieces 10 is placed on the backing piece 31, this tilting can be made small by the pressing machine 7. Thus, the inclination angle of the inclination surface 15 that inclines relative to the front surface 14 (FIG. 4) of the work-pieces 10 can be made small, and the step 16 from the surface 14 to the inclination surface 15 can also be made small.

For this reason, in the present embodiment, the front surface 14 of the work-pieces 10 can be finely finished even if the rotary tool 20a of the modified example of the first embodiment is not used.

Third Embodiment

Next, a third embodiment of the friction stir spot welding device according to the present invention will be described with reference to FIGS. 10 and 11. In addition, since all the following respective embodiments including the present embodiment are modified examples of the member support 30 of the friction stir welding apparatus of the first embodiment, and other portions are fundamentally the same as those of the first embodiment, description of the other portions is omitted below. Additionally, although the following respective embodiments are modified examples of the member support 30 of the friction stir welding apparatus of the first embodiment as described above, the embodiments may be applied to the member support of the second embodiment, and the following respective embodiments may be appropriately combined with one another.

Figure 10:
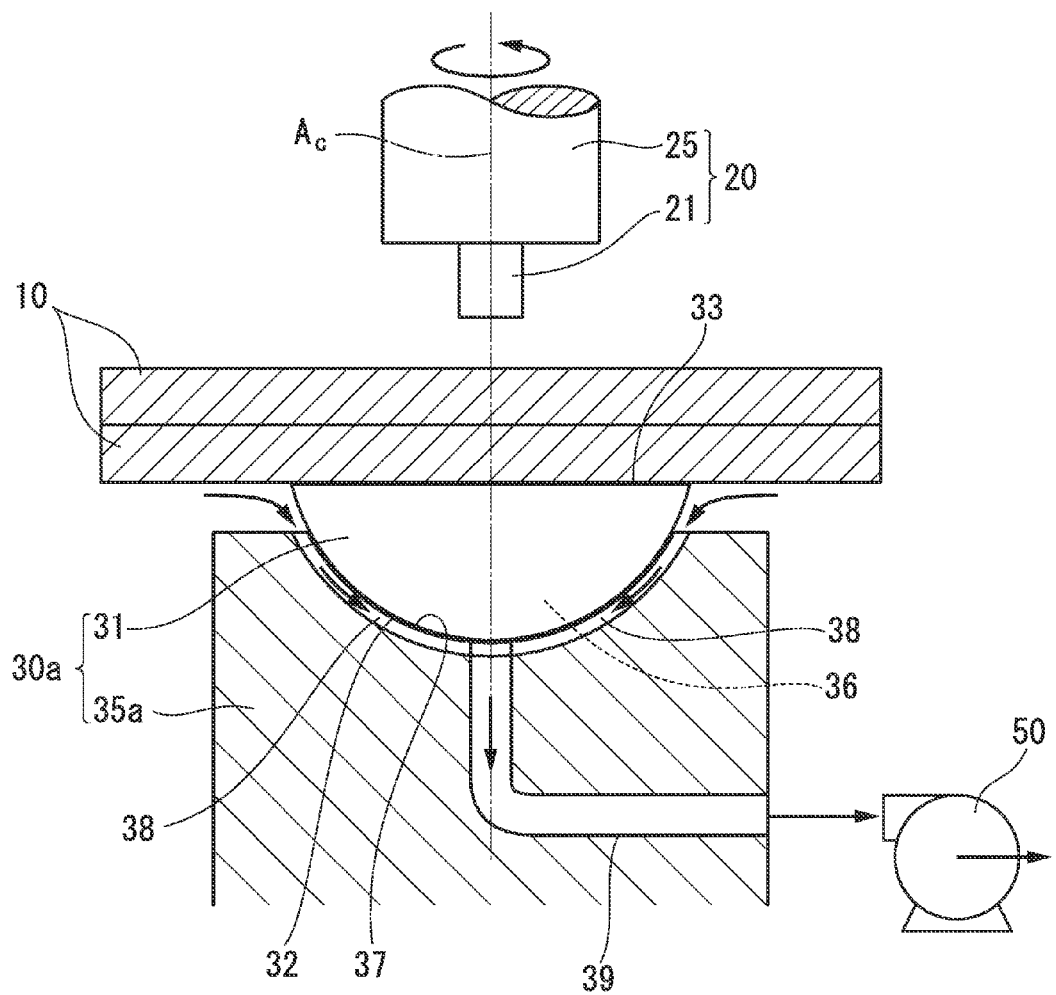
FIG. 10 is a cutaway side view of main parts of a member support in a third embodiment according to the present invention.

As shown in FIG. 10, a member support 30 of the present embodiment has the backing piece 31, and a supporting body 35a that supports the backing piece 31, similarly to the first embodiment. The backing piece 31 of the present embodiment is the same as the backing piece 31 of the first embodiment. On the other hand, although the supporting body 35a of the present embodiment has a spherical shape corresponding to the facing surface 32 of the backing piece 31, similarly to the supporting body 35 of the first embodiment, and is formed with the sliding surface 37 on which the facing surface 32 of the backing piece 31 slides, this supporting body is different from that of the first embodiment in that the sliding surface 37 is formed with a plurality of grooves 38.

Figure 11:
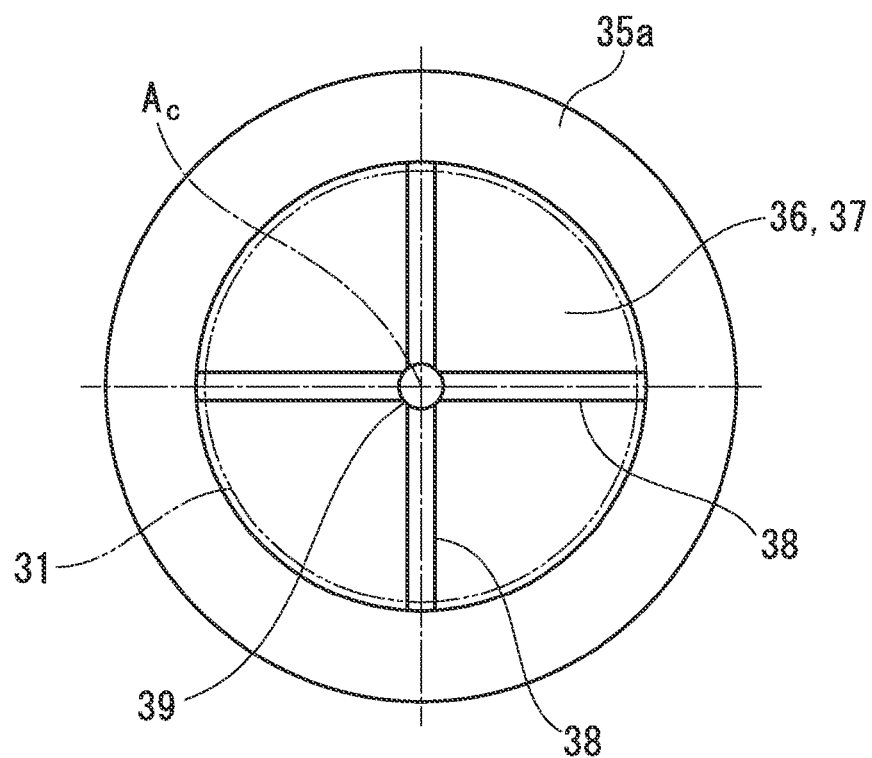
FIG. 11 is a plan view of a supporting body in a third embodiment according to the present invention.

As shown in FIG. 11, all the plurality of grooves 38 extend from one location of the outer edge of the spherical sliding surface 37 to one location of the sliding surface 37 that is opposite with reference to the symmetrical axis Ap of the spherical sliding surface 37. For this reason, the plurality of grooves 38 intersects in the location of the symmetrical axis Ap of the sliding surface 37. In addition, FIG. 11 is a plan view of the supporting body 35a.

The supporting body 35a is further formed with a suction hole 39 that extends from the location where the plurality of grooves 38 intersect each other to the external surface of the supporting body 35 other than a recess 36. A suction blower (cooling medium supply means) 50 is connected to an opening of the suction hole 39.

In the present embodiment, if the suction blower 50 is driven, the air around the supporting body 35a and the backing piece 31 is guided into the suction hole 39 within the supporting body 35 through between the facing surface 32 of the backing piece 31 and the grooves 38 of the supporting body 35a, and is exhausted to the outside via the suction blower 50. For this reason, the backing piece 31 is positively cooled by air, and a spot-welded portion of the work-pieces 10 is also cooled.

Additionally, in the present embodiment, the air around the supporting body 35a and the backing piece 31 is guided into the suction hole 39 within the supporting body 35 through between the facing surface 32 of the backing piece 31 and the grooves 38 of the supporting body 35a. Therefore, the backing piece 31 is also suctioned, and dropping off of the backing piece 31 from the supporting body 35a can be prevented.

In addition, in the present embodiment, the grooves 38 are formed in the sliding surface 37 of the supporting body 35a of the facing surface 32 of the backing piece 31 and the sliding surface 37 of the supporting body 35a. However, the grooves may be formed in the facing surface 32 of the backing piece 31. Additionally, in the present embodiment, dropping off of the backing piece 31 is prevented by sucking air into the supporting body 35. However, in a case where means for preventing the dropping off of the backing piece 31 is separately provided, the backing piece 31 may be cooled by discharging air to the outside through between the facing surface 32 of the backing piece 31 and the grooves 38 of the supporting body 35a from the inside of the supporting body 35.

Fourth Embodiment

Figure 12:
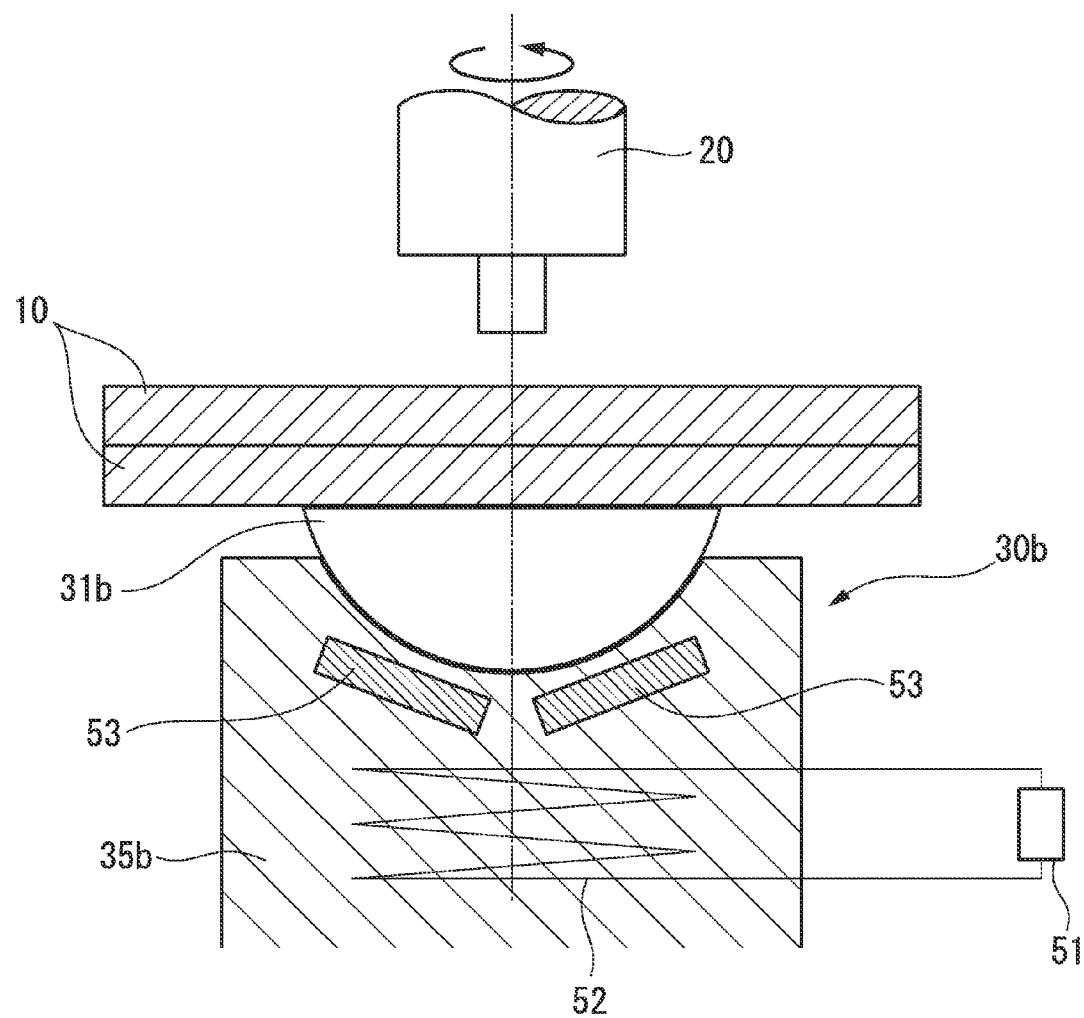
FIG. 12 is a cutaway side view of main parts of a member support in a fourth embodiment according to the present invention.

Next, a fourth embodiment of the friction stir spot welding device according to the present invention will be described with reference to FIG. 12.

A member support 30b of the friction stir spot welding device of the present embodiment is obtained by adding magnets 53 and supporting body cooling means to the member support 30 of the first embodiment.

Although a backing piece 31b of the member support 30b is fundamentally the same as the backing piece 31 of the first embodiment, this backing piece is formed from materials containing magnetic substances, such as ferrous oxide, chromic oxide, and ferrite.

Additionally, although the supporting body 35b of the member support 30b is also fundamentally the same as the supporting body 35 of the first embodiment, this supporting body has the aforementioned magnets 53 and a portion 52 of the support cooling means.

The magnets 53 are permanent magnets 53 and are arranged at positions along the sliding surface 37 of the supporting body 35 within the supporting body 35. Hence, in the present embodiment, the backing piece 31b formed from a material containing a magnetic substance can be pulled near to the supporting body 35b by the magnets 53 to prevent dropping off of the backing piece 31b.

The supporting body cooling means has heat exchanger 51 that is provided outside the supporting body 35b, and cooling piping 52 that extends from the heat exchanger 51 and is contained in the supporting body 35b. For this reason, in the present embodiment, the supporting body 35b, the backing piece 31b supported by the supporting body 35b, and the work-pieces 10 that is placed on the backing piece 31b can be cooled by a cooling medium passing through the cooling piping 52.

Fifth Embodiment

Figure 13:
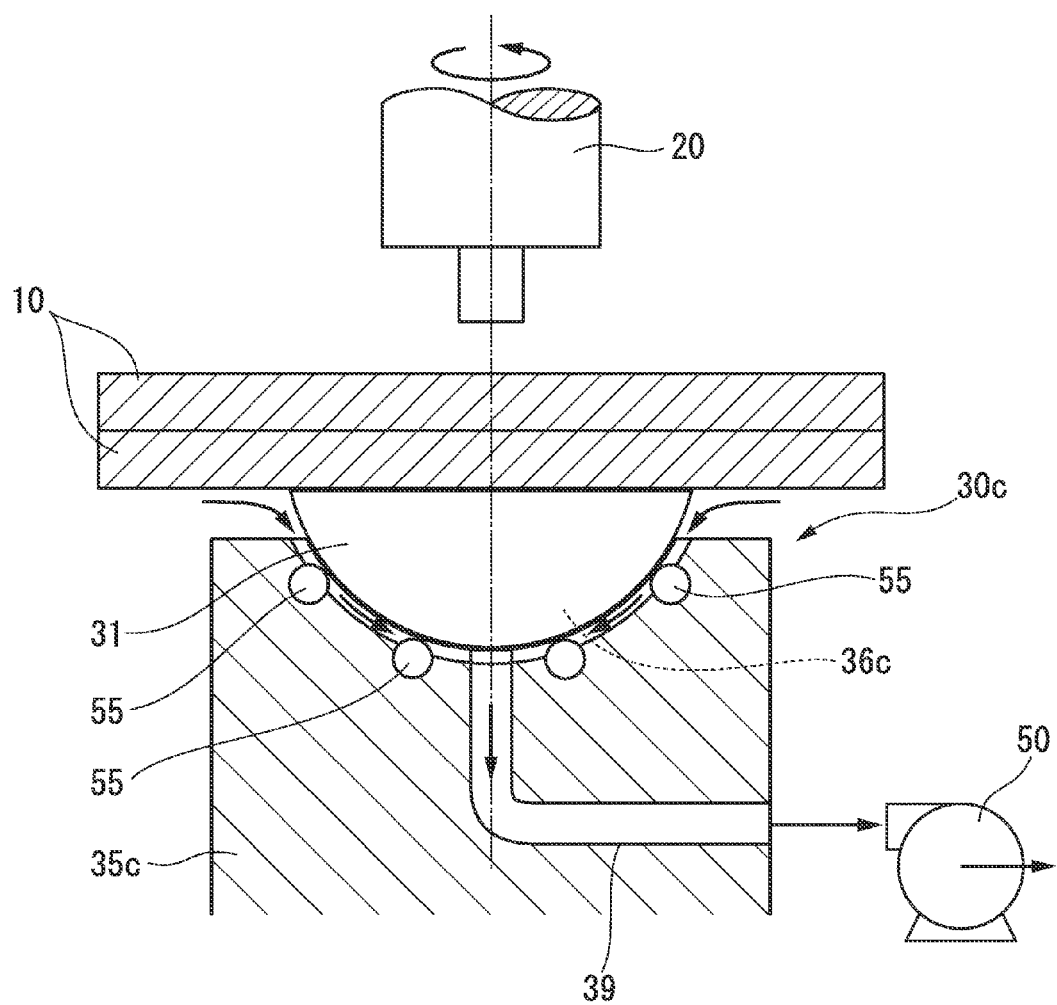
FIG. 13 is a cutaway side view of main parts of a member support in a fifth embodiment according to the present invention.

Next, a fifth embodiment of the friction stir spot welding device according to the present invention will be described with reference to FIG. 13.

In all the member supports 30 of the above embodiments, the facing surface 32 of the backing piece 31 comes into sliding contact with the sliding surface 37 of the supporting body 35. However, a member support 30c of the present embodiment is adapted such that a supporting body 35c is provided with a plurality of spherical rollers 55 and the facing surface 32 of the backing piece 31 comes into rolling contact with the spherical rollers 55.

The supporting body 35c of the present embodiment is also formed with a recess 36c that at least a portion of the facing surface 32 of the backing piece 31 enters, similarly to each above embodiment. The inner surface of the recess 36c has a spherical shape corresponding to the facing surface 32 of the backing piece 31. The aforementioned spherical rollers 55 are rotatably provided in the supporting body 35c such that portions thereof protrude from the inner surface of the recess 36c.

In this way, in the present embodiment, the backing piece 31 comes into rolling contact with the spherical rollers 55. Therefore, even in a case where the backing piece 31 is displaced in a state where the backing piece tilts from the reference state or even in a case where the backing piece is displaced from the tilting state to the reference state, resistance at the time of displacement can be smaller than that of the above embodiments. Accordingly, in a case where the pressing machine 7 is provided as in the second embodiment, even if the work-pieces 10 and the backing piece 31 tilt when the work-pieces 10 is placed on the backing piece 31, this tilting can be easily corrected by adopting the present embodiment.

Additionally, in the present embodiment, similarly to the third embodiment, the suction hole 39 that extends from the bottom of the recess 36c of the supporting body 35c to the external surface of the supporting body 35c except the recess 36c is formed, and the suction blower 50 is connected to the opening of the suction hole 39. For this reason, in the present embodiment, similarly to the third embodiment, the backing piece 31 can be cooled, and dropping off of the backing piece 31 can be prevented.

In addition, although the suction blower 50 is provided here for cooling of the backing piece 31, instead of this, the heat exchanger and the cooling piping may be provided as in the fourth embodiment. Additionally, although the suction blower 50 and the suction hole 39 are provided here in order to prevent the dropping off of the backing piece 31, instead of this, the backing piece 31 may be formed from a material containing a magnetic substance and the supporting body 35c may be provided with the magnets, as in the fourth embodiment.

Sixth Embodiment

Next, a sixth embodiment of the friction stir spot welding device according to the present invention will be described with reference to FIG. 14.

All the backing pieces 31d of the above embodiments form a spherical crown shape, the planar surface of this spherical crown shape forms the bearing surface 33, and the spherical surface of this spherical crown forms the facing surface 32. However, a backing piece 31d of the present embodiment is obtained by cutting away the boundary between the planar surface and spherical surface of the spherical crown.

In addition, although the backing piece 31d does not a spherical crown shape, the relationship between the radius r and height h of the backing piece 31d satisfies the aforementioned (Formula 4).

Even in the present embodiment, the work-pieces 10 tilts in response to the tilting of the backing piece 31d. Thus, fundamentally the same effects as the first embodiment can be obtained.

Moreover, in the present embodiment, a ring-shaped dropping off preventing tool 60 is provided around the recess 36 of the supporting body 35 to prevent dropping off of the backing piece 31d. The dropping off preventing tool 60 has an attachment portion 61 that is fixed to the periphery of the recess 36 of the supporting body 35, a rising portion 62 that rises from the attachment portion 61 to the (−)Z side, and a flange portion 63 with that extends to the side approaching the central axis of rotation Ac of the rotary tool 20 from an end portion of the rising portion 62. The flange portion 63 enters the portion of the backing piece 31d obtained by cutting away the boundary between the planar surface and spherical surface of the spherical crown. For this reason, even if the backing piece 31d tries to come off the supporting body 35, the backing piece contacts the flange portion 63 of the dropping off preventing tool 60, and cannot come off the supporting body 35.

In addition, the facing surfaces 32 of all the backing pieces of the above embodiments including the present embodiment have a spherical shape. However, in the present invention, in a case where the inner surface of the recess 36 of the supporting body 35 has a spherical shape, the facing surface of the backing piece does not need to have a spherical surface, and at least three points on a virtual spherical surface may be adopted as the facing surface. In this case, with respect to a shape formed by the virtual spherical surface including at least three points and the bearing surface 33, the relationship between height h based on the bearing surface 33 and the radius r of the virtual spherical surface needs to satisfy the aforementioned (Formula 4).

Seventh Embodiment

Next, a seventh embodiment of the friction stir spot welding device according to the present invention will be described with reference to FIG. 15.

In the above embodiments, the facing surface 32 of the backing piece 31 have a spherical shape, supposing that the backing piece 31 tilts in respective directions perpendicular to the central axis of rotation Ac of the rotary tool 20. However, in a case where the backing piece 31 mainly tilts only in one direction perpendicular to the central axis of rotation Ac of the rotary tool 20, and the backing piece 31 hardly tilts in other directions perpendicular to the central axis of rotation Ac of the rotary tool 20, the facing surface of the backing piece may not have a spherical shape but may have a cylindrical outer peripheral surface shape.

Figure 15:
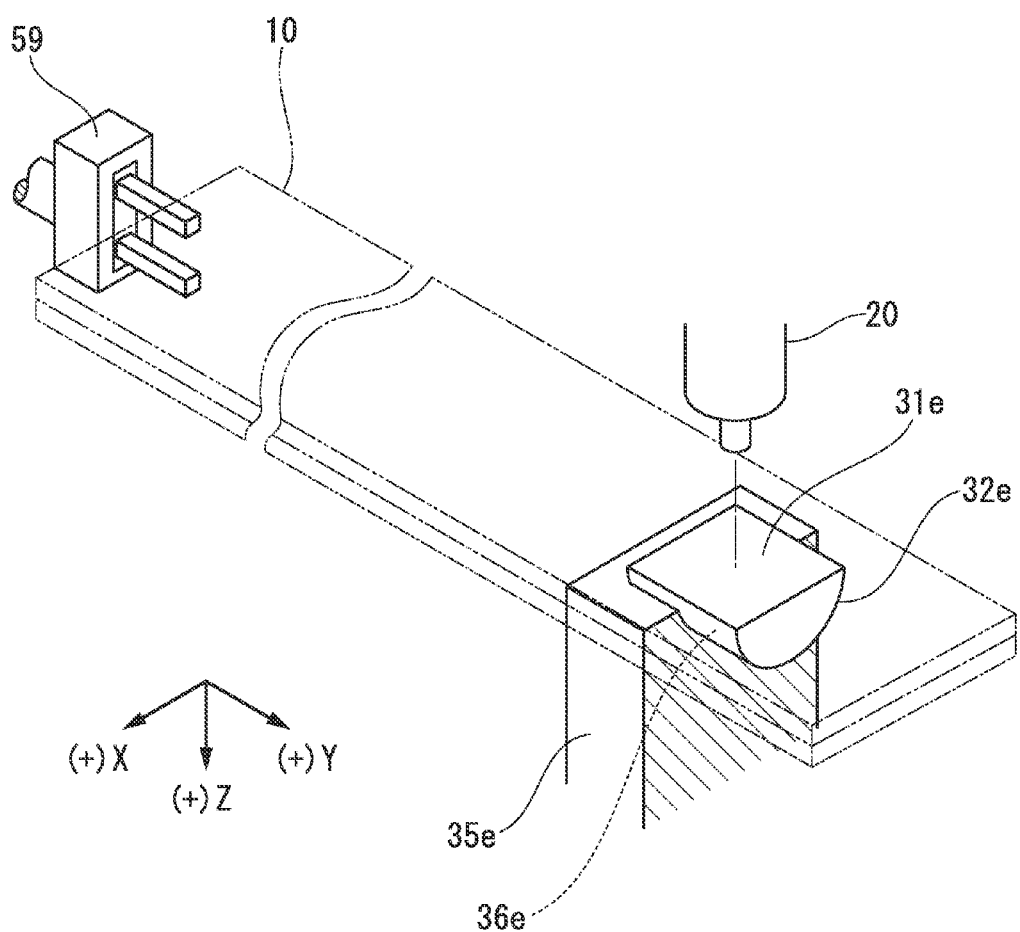
FIG. 15 is a cutaway perspective view of main parts of a member support in a seventh embodiment according to the present invention.
Figure 16:
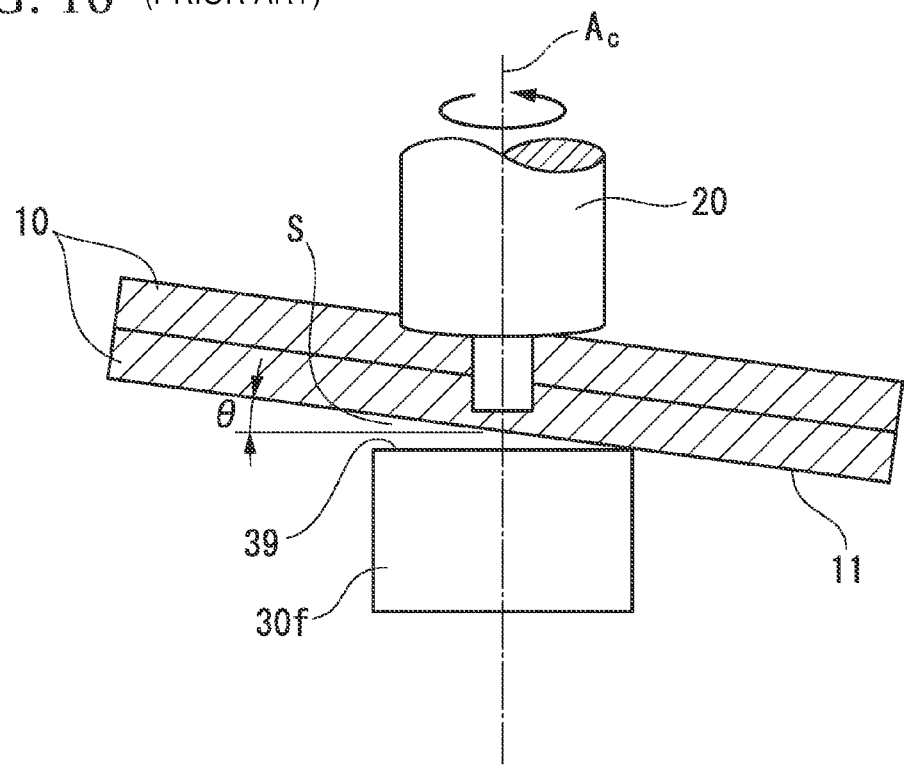
FIG. 16 is an explanatory view showing the positional relationship of a member support and work-pieces during welding processing in the related art.

Here, for example, as shown in FIG. 15, a case where the work-pieces 10 is a rectangular plate in which long sides are significantly long with respect to short sides, a portion on one short side of a pair of short sides is placed on the backing piece, and a portion on the other short side is gripped by a robot 59 or the like is considered.

In this case, the work-pieces 10 hardly tilts within a virtual YZ plane including a Y-axis parallel to the long sides of the work-pieces 10, and a Z-axis parallel to the central axis of rotation Ac. On the other hand, the work-pieces 10 may tilt within a virtual ZX plane including an X-axis perpendicular to the Y-axis and the Z-axis, and the Z-axis.

Thus, in this case, a backing piece 31e whose facing surface 32e has a cylindrical outer peripheral surface shape, in other words, a substantially semi-columnar backing piece 31e is arranged such that the central axis of this column becomes parallel to the Y-axis, and this backing piece 31e tilts within the ZX plane. In addition, although a case where the backing piece 31e is turned to a predetermined direction according to the direction of the work-pieces 10 is described above, practically, the work-pieces 10 is turned to a predetermined direction according to the direction of the backing piece 31e.

As described above, although the present embodiment is a modified example of the first embodiment, the backing piece of the present embodiment may be applied to the backing pieces of the second to sixth embodiments. However, in a case where the supporting body is provided with the plurality of rollers as in the fifth embodiment after the facing surface 32e of the backing piece 31e is formed into a cylindrical outer peripheral surface shape, the rollers may be the spherical rollers similarly to the fifth embodiment but may be cylindrical rollers.

Additionally, in the present invention, in a case where the inner surface of the recess 36e of the supporting body 35e has a cylindrical outer peripheral surface shape, the facing surface 32e of the backing piece 31e does not need to have a cylindrical outer peripheral surface shape, and at least three points on a virtual cylinder outer peripheral surface may be adopted as the facing surface. In this case, with respect to a shape formed by the virtual cylindrical outer peripheral surface including at least three points and the bearing surface of the backing piece, the relationship between height h based on the bearing surface and the radius r of the virtual spherical surface needs to satisfy the aforementioned (Formula 4).

REFERENCE SIGNS LIST

1: TOOL FIXTURE
3: TOOL DRIVING MECHANISM
4: FRAME
6: CONTROLLER
7: PRESSING MACHINE
10: WORK-PIECES
11: BACK SURFACE (OF WORK-PIECES)
20, 20a: ROTARY TOOL
21: PROBE PART
25, 25a: SHOULDER PART 26, 26a: SHOULDER SURFACE
30, 30a, 30b, 30c: MEMBER SUPPORT
31, 31b, 31d, 31e: BACKING PIECE
32, 32e: FACING SURFACE (OF BACKING PIECE)
33: BEARING SURFACE (OF BACKING PIECE)
35, 35a, 35b, 35c, 35e: SUPPORTING BODY
36, 36c, 36e: RECESS (OF SUPPORTING BODY)
37: SLIDING SURFACE (OF SUPPORTING BODY)
38: GROOVE
39: SUCTION HOLE
50: SUCTION BLOWER
51: HEAT EXCHANGER
52: COOLING PIPING
53: MAGNET
55: ROLLER
60: DROPPING OFF PREVENTING TOOL
Ac: CENTRAL AXIS OF ROTATION (OF ROTARY TOOL)
Ap: SYMMETRICAL AXIS (OF BACKING PIECE)

The invention claimed is:

1. A friction stir spot welding device that moves a rotary tool along a central axis of rotation of the rotary tool towards work-pieces while rotating the rotary tool around the central axis of rotation, to perform friction stir spot welding of the work-pieces, the device comprising:
  a member support that supports the work-pieces; and
  a frame that supports the member support,
  wherein the member support includes a backing piece and a supporting body that supports the backing piece so that the backing piece is capable of tilting,
  wherein the backing piece includes a bearing surface that contacts the work-pieces and a facing surface that is a curved surface of the backing piece,
  wherein the backing piece has a circular segment shaped cross section,
  wherein the facing surface faces the supporting body,
  wherein the supporting body is formed with a recess in which at least a portion of the facing surface of the backing piece is disposed,
  wherein an inner surface of the recess forms a sliding surface that is curved,
  wherein the facing surface of the backing piece is slidably supported by an entirety of the sliding surface of the supporting body,
  wherein in the backing piece, an amount of change in a position of the bearing surface on the central axis of rotation between a reference state in which the bearing surface is perpendicular to the central axis of rotation and a tilted state in which the bearing surface is tilted in response to the tilting of the work-pieces, is less than or equal to a predetermined embedding amount with which a shoulder part of the rotary tool is embedded in the work-pieces in the reference state, and
  wherein, in a cross section of the backing piece and the supporting body along the central axis of rotation, an arc length of the facing surface of the backing piece is longer than an arc length of the sliding surface of the supporting body, such that a portion of the arc length of the facing surface does not contact the sliding surface in the tilted state.

2. The friction stir spot welding device according to claim 1,
  wherein a relationship between a radius of the curved surface of the backing piece and a height of the backing piece based on the bearing surface satisfies the following condition:
  the amount of change in the position of the bearing surface between the reference state and the tilted state, wherein in the tilted state front surfaces of the work-pieces are tilted at an angle with respect to a plane perpendicular to the central axis of rotation of the rotary tool, is defined as a maximum permissible tilting angle that is less than or equal to the embedding amount.

3. The friction stir spot welding device according to claim 1,
  wherein the backing piece has a spherical crown shape in which a portion of a sphere is cut away, and a planar surface of the spherical crown shape forms the bearing surface.

4. A friction stir spot welding device that moves along a central axis of rotation of a rotary tool towards work-pieces while rotating the rotary tool around the central axis of rotation, to perform friction stir spot welding of the work-pieces, the device comprising:
  a member support that supports the work-pieces; and
  a frame that supports the member support,
  wherein the member support includes a backing piece and a supporting body that supports the backing piece so that the backing piece is capable of tilting,
  wherein the backing piece includes a bearing surface that contacts the work-pieces and a facing surface that is a curved surface of the backing piece,
  wherein the backing piece has a semicircular cross section,
  wherein the facing surface faces the supporting body,
  wherein the supporting body is formed with a recess in which at least a portion of the facing surface of the backing piece is disposed,
  wherein an inner surface of the recess forms a sliding surface that is curved,
  wherein the facing surface of the backing piece is slidably supported by an entirety of the sliding surface of the supporting body, and
  wherein, in a cross section of the backing piece and the supporting body along the central axis of rotation, an arc length of the facing surface of the backing piece is longer than an arc length of the sliding surface of the supporting body, such that a portion of the arc length of the facing surface does not contact the sliding surface in a tilted state.

5. The friction stir spot welding device according to claim 3,
  wherein the backing piece has a semi-spherical shape.

6. The friction stir spot welding device according to claim 4,
  wherein the backing piece has a semi-cylindrical shape.

7. The friction stir spot welding device according to claim 1,
  wherein a maximum width dimension of the bearing surface is equal to or greater than an external diameter dimension of the shoulder part of the rotary tool.

8. The friction stir spot welding device according to claim 1,
  wherein the supporting body has a plurality of rollers that comes into rolling contact with the facing surface of the backing piece.

9. The friction stir spot welding device according to claim 1,
  wherein the inner surface of the recess has a shape corresponding to the curved facing surface.

10. The friction stir spot welding device according to claim 9,
  wherein one of the sliding surface of the supporting body and the facing surface of the backing piece is formed with a groove for passing a cooling medium between the sliding surface and the facing surface and an exterior of the device.

11. The friction stir spot welding device according to claim 8, further comprising
a cooling medium supply means for supplying a cooling medium provided between the supporting body and the facing surface of the backing piece.

12. The friction stir spot welding device according to claim 11,
wherein the cooling medium supply means is configured to suction gas from an exterior of the supporting body and the backing piece into the supporting body between the supporting body and the facing surface, and then exhaust the gas to the exterior of the supporting body.

13. The friction stir spot welding device according to claim 1, further comprising supporting body cooling means for cooling the supporting body.

14. The friction stir spot welding device according to claim 1,
wherein one of the backing piece and the supporting body has a magnetic body and the other has a magnet that attracts the magnetic body.

15. The friction stir spot welding device according to claim 1, further comprising pressing means for pressing the work-pieces against the bearing surface of the backing piece from a plurality of symmetrical positions based on the central axis of rotation of the rotary tool.

16. A member support for friction stir spot welding that moves a rotary tool along a central axis of rotation of the rotary tool toward work-pieces while rotating the rotary tool around the central axis of rotation, to support the work-pieces when performing friction stir spot welding thereof, the member support comprising:
a backing piece having a bearing surface that contacts the work-pieces and a facing surface that is a curved surface of the backing piece; and
a supporting body that supports the backing piece so that the backing piece is capable of tilting,
wherein the backing piece has a circular segment shaped cross section,
wherein the facing surface faces the supporting body,
wherein the supporting body is formed with a recess in which at least a portion of the facing surface of the backing piece is disposed,
wherein an inner surface of the recess forms a sliding surface that is curved,
wherein the facing surface of the backing piece is slidably supported by an entirety of the sliding surface of the supporting body,
wherein in the backing piece, an amount of change in a position of the bearing surface on the central axis of rotation between a reference state in which the bearing surface is perpendicular to the central axis of rotation and a tilted state in which the bearing surface is tilted in response to the tilting of the work-pieces, is less than or equal to a predetermined embedding amount with which a shoulder part of the rotary tool is embedded in the work-pieces in the reference state, and
wherein, in a cross section of the backing piece and the supporting body along the central axis of rotation, an arc length of the facing surface of the backing piece is longer than an arc length of the sliding surface of the supporting body, such that a portion of the arc length of the facing surface does not contact the sliding surface in the tilted state.

17. A method for manufacturing a friction stir spot welding product comprising,
joining work-pieces by friction stir spot welding using the friction stir spot welding device according to claim 1.

18. A method for manufacturing a friction stir spot welding product in which work-pieces are joined by friction stir spot welding, the method comprising:
forming a backing piece having a bearing surface that contacts the work-pieces and a facing surface that is a curved surface of the backing piece,
forming the backing piece with a circular segment cross section,
stacking work-pieces on the bearing surface to support the work-pieces;
forming a recess in the supporting body in which at least a portion of the facing surface of the backing piece is disposed,
forming a sliding surface on the recess, the sliding surface being curved,
slidably supporting the backing piece on an entirety of the sliding surface of the supporting body, and
joining the work-pieces stacked on the bearing surface of the backing piece by friction stir spot welding in which a rotary tool moves along a central axis of rotation of the rotary tool towards the work-pieces while rotating around the central axis of rotation,
wherein when the friction stir spot welding is performed, an amount of change in a position of the bearing surface on the central axis of rotation between a reference state in which the bearing surface is perpendicular to the central axis of rotation and a tilted state in which the bearing surface tilts in response to the tilting of the work-pieces, is less than or equal to a predetermined embedding amount with which a shoulder part of the rotary tool is embedded in the work-pieces in the reference state, and
wherein, in a cross section of the backing piece and the supporting body along the central axis of rotation, an arc length of the facing surface of the backing piece is longer than an arc length of the sliding surface of the supporting body, such that a portion of the arc length of the facing surface does not contact the sliding surface in the tilted state.

19. A method for manufacturing a friction stir spot welding product comprising,
joining work-pieces by friction stir spot welding using the friction stir spot welding device according to claim 4.

* * * * *